(12) United States Patent
Hirose et al.

(10) Patent No.: US 11,501,354 B2
(45) Date of Patent: Nov. 15, 2022

(54) INFORMATION PROCESSING APPARATUS FOR SEARCHING DATABASE

(71) Applicant: FUJITSU LIMITED, Kawasaki (JP)

(72) Inventors: Atsuhito Hirose, Odawara (JP); Tamaki Tanaka, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 436 days.

(21) Appl. No.: 16/725,212

(22) Filed: Dec. 23, 2019

(65) Prior Publication Data

US 2020/0250726 A1 Aug. 6, 2020

(30) Foreign Application Priority Data

Jan. 31, 2019 (JP) .............................. JP2019-014992

(51) Int. Cl.
*G06F 16/22* (2019.01)
*G06F 16/2458* (2019.01)
*G06Q 30/06* (2012.01)

(52) U.S. Cl.
CPC ..... *G06Q 30/0625* (2013.01); *G06F 16/2246* (2019.01); *G06F 16/2462* (2019.01)

(58) Field of Classification Search
CPC ............ G06F 16/2246; G06F 16/2462; G06Q 30/0625
USPC ........................ 707/711, 741, 736; 705/26.62
See application file for complete search history.

(56) References Cited

U.S. PATENT DOCUMENTS

2007/0239681 A1* 10/2007 Krishnaprasad ........ G06F 16/81
2014/0181141 A1 6/2014 Sowell et al.
2016/0026666 A1* 1/2016 Namiki ............... G06F 16/2255
707/744
2017/0242911 A1* 8/2017 Agarwal ............... G06F 16/319

FOREIGN PATENT DOCUMENTS

| JP | 2004-118290 | 4/2004 |
|---|---|---|
| JP | 2009-223456 | 10/2009 |
| JP | 2012-108635 | 6/2012 |
| JP | 2017-157229 | 9/2017 |

OTHER PUBLICATIONS

Namiki Yuta. JP2012-108635 published Jun. 7, 2012 in ids—(japanese application No. jp2010255654). translation in english from by European patent office (Year: 2012).*
Japanese Patent Office, Office Action dated Aug. 9, 2022 for corresponding Japanese Application No. 2019-14992, 12 pages, only english portion was reviewed.

* cited by examiner

*Primary Examiner* — Michael Pham
(74) *Attorney, Agent, or Firm* — Fujitsu Patent Center

(57) ABSTRACT

A memory stores therein, with respect to a database containing records each having a first data item and a second data item, an index that includes, in association with each candidate value that is used as the first data item, record specification information specifying two or more records with the candidate value and a statistical value obtained from values of the second data item registered in the two or more records. A processor receives a query including a search condition specifying a requested value of the first data item and a command requesting statistical processing of values of the second data item registered in records satisfying the search condition, retrieves the statistical value associated with a candidate value satisfying the search (Continued)

condition from the index, and outputs a processing result based on the retrieved statistical value for the query.

5 Claims, 24 Drawing Sheets

ORDER MESSAGE 131

| TRADING TYPE | 1 |
|---|---|
| LIMIT PRICE | 8500 |
| QUANTITY | 100 |
| ORDER DATE AND TIME | 2018-1030-0910 |
| ORDER NUMBER | 00000020581 |
| SECURITY CODE | 6802 |
| REQUESTING SOURCE | R SECURITIES |

FIG. 5

ORDER BOOK INFORMATION — 132

| SELL VOLUME | INDICATIVE PRICE | BUY VOLUME |
|---|---|---|
| 3865200 | Over | 0 |
| 21900 | 9000 | 0 |
| 69700 | 8900 | 0 |
| 1100 | 8800 | 0 |
| 5300 | 8700 | 0 |
| 200 | 8600 | 0 |
| 0 | 8500 | 400 |
| 0 | 8400 | 1600 |
| 0 | 8300 | 900 |
| 0 | 8200 | 18200 |
| 0 | Under | 8085300 |

FIG. 6

SELL ORDER TABLE

| SELLING PRICE | QUANTITY | ORDER DATE AND TIME | ORDER NUMBER | SECURITY CODE | REQUESTING SOURCE |
|---|---|---|---|---|---|
| 8600 | 100 | 2018-1030-0900 | 00000009795 | 6802 | C SECURITIES |
| 8600 | 100 | 2018-1030-0900 | 00000009811 | 6802 | B SECURITIES |
| 8700 | 1000 | 2018-1030-0900 | 00000009813 | 6802 | A SECURITIES |
| 8700 | 300 | 2018-1030-0909 | 00000010051 | 6802 | E SECURITIES |
| 8700 | 1500 | 2018-1030-0909 | 00000010338 | 6802 | A SECURITIES |
| 8700 | 500 | 2018-1030-0909 | 00000011125 | 6802 | A SECURITIES |
| 8700 | 1000 | 2018-1025-0909 | 00000000106 | 6802 | A SECURITIES |
| ... | ... | ... | ... | ... | ... |

BUY ORDER TABLE 134

| BUYING PRICE | QUANTITY | ORDER DATE AND TIME | ORDER NUMBER | SECURITY CODE | REQUESTING SOURCE |
|---|---|---|---|---|---|
| 8500 | 100 | 2018-1030-0900 | 00000009785 | 6802 | A SECURITIES |
| 8500 | 200 | 2018-1030-0900 | 00000009905 | 6802 | B SECURITIES |
| 8500 | 100 | 2018-1030-0900 | 00000010010 | 6802 | A SECURITIES |
| 8400 | 500 | 2018-1030-0909 | 00000020055 | 6802 | C SECURITIES |
| 8400 | 100 | 2018-1030-0909 | 00000020138 | 6802 | D SECURITIES |
| 8400 | 1000 | 2018-1030-0909 | 00000020425 | 6802 | B SECURITIES |
| 8300 | 100 | 2018-1029-0904 | 00000000103 | 6802 | E SECURITIES |
| ... | ... | ... | ... | ... | ... |

FIG. 8

TABLE DEFINITION FILE                    138

```
create table SEL_ORDER [
        SELLING PRICE           INTEGER NOT NULL,
        QUANTITY                INTEGER,
        ORDER DATE AND TIME     CHAR (32),
        ORDER NUMBER            INTEGER,
        SECURITY CODE           SMALLINT,
        REQUESTING SOURCE       CHAR (4)
];
ALTER TABLE SEL_ORDER CONSTRAINT
SEL_ORDER_PK PRIMARY KEY (ORDER NUMBER);
CREATE INDEX INDEX_STOCK_PRICE
ON SEL_ORDER (SELLING PRICE)
WITH SUM (QUANTITY);

create table BUY_ORDER [
        BUYING PRICE            INTEGER NOT NULL,
        QUANTITY                INTEGER,
        ORDER DATE AND TIME     CHAR (32),
        ORDER NUMBER            INTEGER,
        SECURITY CODE           SMALLINT,
        REQUESTING SOURCE       CHAR (4)
];
ALTER TABLE BUY_ORDER CONSTRAINT
BUY_ORDER_PK PRIMARY KEY (ORDER NUMBER);
CREATE INDEX INDEX_STOCK_PRICE
ON BUY_ORDER (BUYING PRICE)
WITH SUM (QUANTITY);
```

FIG. 12

INFORMATION PROCESSING APPARATUS FOR SEARCHING DATABASE

CROSS-REFERENCE TO RELATED APPLICATION

This application is based upon and claims the benefit of priority of the prior Japanese Patent Application No. 2019-014992, filed on Jan. 31, 2019, the entire contents of which are incorporated herein by reference.

FIELD

The embodiments discussed herein relate to an information processing apparatus for searching a database.

BACKGROUND

One of information processing systems is a database system that receives an inquiry (query) expressed in query language, such as SQL, and in response to the received query, accesses a database in which data is systematically stored. Such queries include a search query of fetching records satisfying specified conditions from the database. A query may request computation of a statistical value, such as the sum, maximum value, minimum value, or average, with a set function, such as SUM, MAX, MIN, or AVG, from a plurality of records. In addition, the database system may hold an index for locating records on the basis of a value of a data item other than a primary key, so as to achieve a fast search for the records satisfying specified conditions.

By the way, there has been proposed a movement trajectory data search apparatus that searches for movement trajectory data similar to certain movement trajectory data. The proposed movement trajectory data search apparatus computes, with respect to each movement trajectory data stored in a database, the average of a plurality of positional coordinates included in the movement trajectory data, and creates an index with respect to the average. When receiving movement trajectory data, the movement trajectory data search apparatus computes its average, and compares the computed average with the index to find other movement trajectory data similar to the received movement trajectory data.

There has also been proposed a database server that processes a query including a command for a set function, such as a sum function. When receiving such a query, the proposed database server inquires a plurality of data nodes holding a table in a divided manner, for the number of records with a specified value. The database server then performs the set function requested in the query using replies indicating the number of records, received from the data nodes, and generates a processing result for the query.

There has also been proposed an analysis system that accesses a non-relational database in response to a query against a relational database. The proposed analysis system retrieves an object from the non-relational database and predicts a schema for the retrieved object. The analysis system stores the retrieved object in an array index, generates a processing result for the query against the relational database on the basis of the array index, and returns the processing result.

See, for example, the following documents:
Japanese Laid-open Patent Publication No. 2004-118290;
Japanese Laid-open Patent Publication No. 2012-108635; and
Japanese Laid-open Patent Publication No. 2017-157229.

A database system may aggregate a plurality of records satisfying specified search conditions to compute a statistical value, such as the sum, maximum value, minimum value, or average, with respect to values of a specified data item. In the case where the database system performs this search process simply, it would actually and individually access the plurality of records satisfying the search conditions using an index and retrieve the values of the specified data item from the records. However, this case has the following problem: If such a search process is performed each time one statistical value is computed, a higher load would be imposed on the database system and thus a response time would be long.

SUMMARY

According to one aspect, there is provided an information processing apparatus including: a memory that stores therein, with respect to a database containing a plurality of records each having a first data item and a second data item, an index including, in association with each of a plurality of candidate values that are used as the first data item, record specification information specifying two or more records with the candidate value as the first data item among the plurality of records and a statistical value obtained from values of the second data item registered in the two or more records specified by the record specification information; and a processor that receives a query including a search condition specifying a requested value of the first data item and a command requesting statistical processing of values of the second data item registered in records satisfying the search condition among the plurality of records, retrieves the statistical value associated with one of the plurality of candidate values satisfying the search condition from the index, and outputs a processing result based on the retrieved statistical value for the query.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a view illustrating an example of an order message;

FIG. 6 is a view illustrating an example of order book information;

FIG. 7 is a view illustrating an example of a sell order table;

FIG. 8 is a view illustrating an example of a buy order table;

FIG. 12 is a view illustrating an example of a table definition file;

DESCRIPTION OF EMBODIMENTS

Hereinafter, preferred embodiments will be described in detail with reference to the accompanying drawings.

First Embodiment

A first embodiment will be described.

Figure 1:
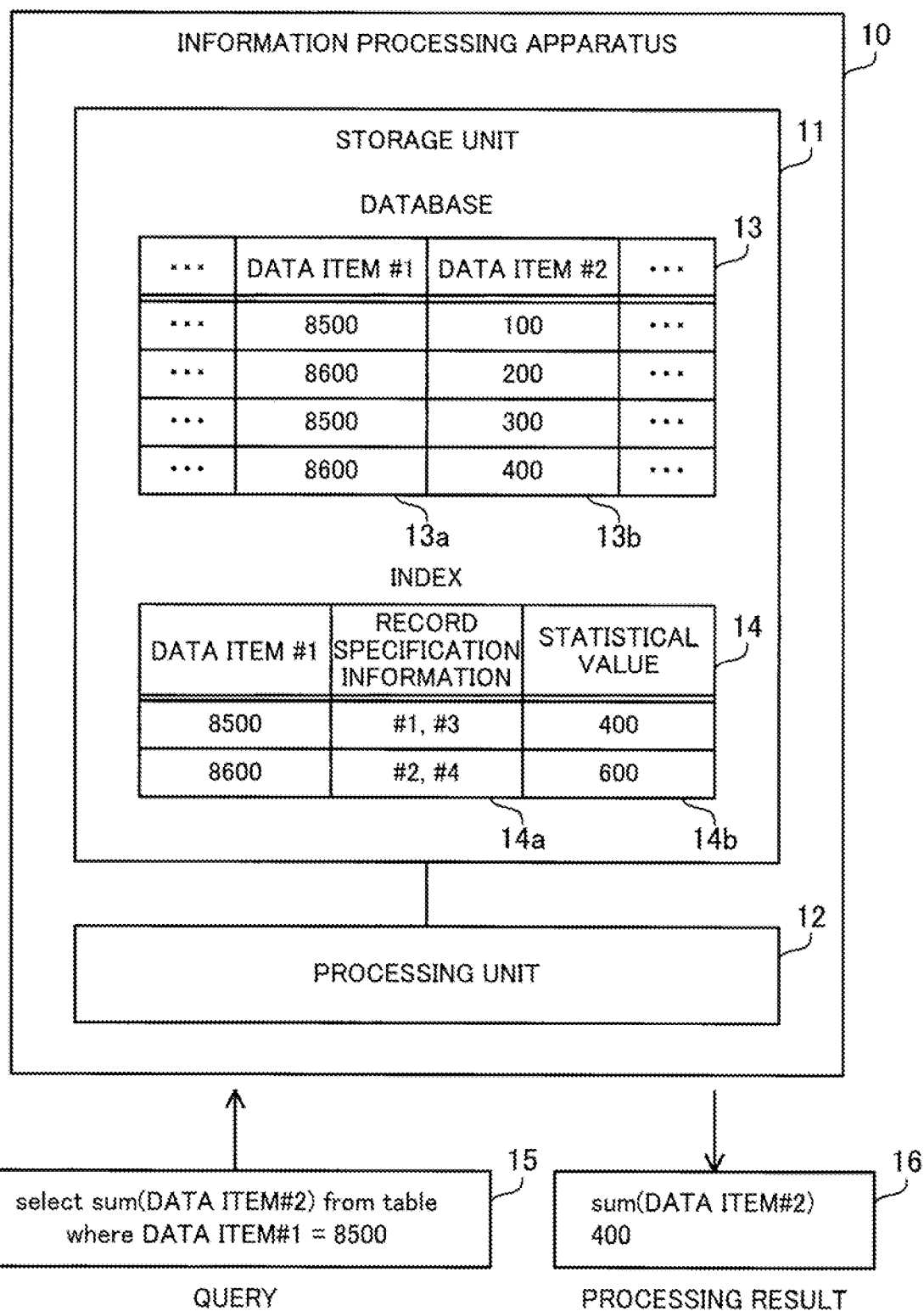
FIG. 1 is a view for explaining an example of an information processing apparatus according to a first embodiment.

FIG. 1 is a view for explaining an example of an information processing apparatus according to the first embodiment.

The information processing apparatus 10 of the first embodiment is a computer that searches a database in response to a query. The information processing apparatus 10 may be a client apparatus that is operated by a user or a server apparatus that is accessed by a client apparatus or another server apparatus.

The information processing apparatus 10 includes a storage unit 11 and a processing unit 12. The storage unit 11 may be a volatile semiconductor memory, such as a random access memory (RAM), or a non-volatile storage device, such as a hard disk drive (HDD) or a flash memory. The processing unit 12 is a central processing unit (CPU), a graphics processing unit (GPU), a digital signal processor (DSP), or another processor, for example. In this connection, the processing unit 12 may include an application-specific integrated circuit (ASIC), a field programmable gate array (FPGA), or another application-specific electronic circuit. The processor runs a program stored in a memory such as a RAM (or the storage unit 11). A set of multiple processors may be called a "multiprocessor," or simply a "processor."

The storage unit 11 stores therein an index 14 corresponding to a database 13.

The database 13 contains a plurality of records each having a data item 13a (first data item) and a data item 13b (second data item). For example, the database 13 is a relational database, the data items 13a and 13b are represented as columns of a table, and each record is a tuple (a collection of stored data in a row) of the table. Neither the data item 13a nor 13b may be a primary key. As an example, a record represents an order of a product, and the data items 13a and 13b indicate price and quantity, respectively.

The index 14 includes record specification information 14a and a statistical value 14b in association with each candidate value that is used as the data item 13a. The index 14 may be a tree index in which a plurality of nodes corresponding to the plurality of candidate values are arranged in a tree structure. For example, the index 14 may be a B-tree index. In this case, the record specification information 14a and statistical value 14b are registered in each node.

The record specification information 14a specifies, among the plurality of records in the database 13, two or more records that each have a corresponding candidate value as the data item 13a. The record specification information 14a may list the addresses of the records. The statistical value 14b is a value that is computed by performing statistical processing on the values registered as the data item 13b in the two or more records specified by the record specification information 14a. For example, the statistical value 14b is the sum, maximum value, minimum value, average, or another of the values registered as the data item 13b in the two or more records. Two or more types of statistical values may be recorded in the index 14.

As an example, in the database 13, the first record has 8500 as the data item 13a and 100 as the data item 13b. The second record has 8600 as the data item 13a and 200 as the data item 13b. The third record has 8500 as the data item 13a and 300 as the data item 13b. The fourth record has 8600 as the data item 13a and 400 as the data item 13b. In this case, the index 14 has #1 and #3 as the record specification information 14a and 400 as the statistical value 14b in association with the data item 13a of 8500. In addition, the index 14 has #2 and #4 as the record specification information 14a and 600 as the statistical value 14b in association with the data item 13a of 8600. In this connection, the statistical value 14b is the sum of values registered as the data item 13b.

The processing unit 12 receives a query 15 against the database 13. The query 15 may be issued by an application software running on the information processing apparatus 10 or by another information processing apparatus. In addition, the query 15 may be a character string expressed in query language, such as SQL.

The query 15 includes a search condition specifying a requested value of the data item 13a. The search condition may specify a specific value or a specific range of values for the data item 13a. In addition, the query 15 includes a command requesting statistical processing of values of the data item 13b in records satisfying the search condition. The command may request execution of a set function, such as a sum function SUM, a maximum value function MAX, a minimum value function MIN, or an average function AVG. As an example, the query 15 indicates a search condition that the data item 13a is 8500 and requests the sum of values of the data item 13b in records satisfying the search condition. The query 15 may request computation of the total quantity from records with a specified price.

In response to the query 15, the processing unit 12 searches the index 14 for a candidate value satisfying the search condition and retrieves a statistical value 14b associated with the candidate value. At this time, the processing unit 12 does not need to individually access the records on the basis of the record specification information 14a associated with the candidate value. The processing unit 12 outputs a processing result 16 based on the retrieved statistical value 14b for the query 15. The processing result 16 includes a result of the statistical processing requested by the query 15. The processing result 16 may include the statistical value 14b retrieved from the index 14 or may include a value computed from two or more statistical values 14b (for example, the sum of the two or more statistical values 14b) retrieved from the index 14. As an example, the processing unit 12 retrieves the statistical value 14b of 400 associated with the data item 13a of 8500 from the index 14 and outputs the processing result 16 including the retrieved statistical value 14b of 400.

In this first embodiment, the information processing apparatus 10 prepares the index 14, which includes, in association with each candidate value that is used as the data item 13a, the record specification information 14a specifying two or more records with the candidate value and the statistical value 14b obtained from the values of the data item 13b in these two or more records. Then, the information processing apparatus 10 receives the query 15, which includes a search condition specifying a requested value of the data item 13a and a command requesting statistical processing of values of the data item 13b in records satisfying the search condition. In response to the query 15, the information processing apparatus 10 retrieves the statistical value 14b associated with a candidate value satisfying the search condition from the index 14. Then, the information processing apparatus 10 outputs the processing result 16 based on the retrieved statistical value 14b for the query 15. As described above, the use of the index 14 eliminates the necessity of individually accessing the records satisfying the search condition to retrieve the values of the data item 13b, and makes it possible to efficiently generate the processing result 16 for the query 15 requesting the statistical processing. As a result, the load on the information processing apparatus 10 is reduced and a response to the query 15 is accelerated.

Second Embodiment

A second embodiment will now be described.

Figure 2:
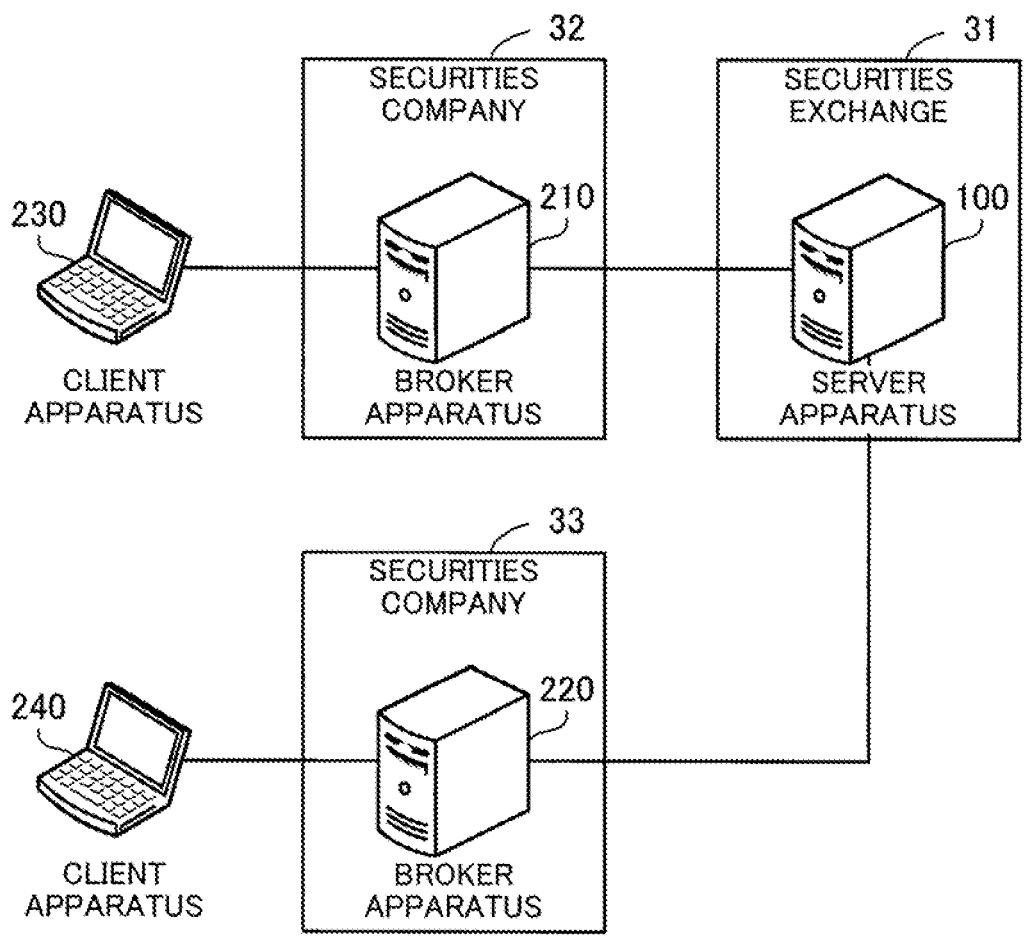
FIG. 2 is a view illustrating an example of an information processing system according to a second embodiment.

FIG. 2 is a view illustrating an example of an information processing system according to the second embodiment.

An information processing system of the second embodiment is a securities trading system for bringing buyers and sellers of stocks together. This information processing system includes a server apparatus 100, a plurality of broker apparatuses including broker apparatuses 210 and 220, and a plurality of client apparatuses including client apparatuses 230 and 240. These apparatuses are connected to a wide-area data communication network, such as the Internet, and communicate with each other over the wide-area data communication network. In this connection, the server apparatus 100 corresponds to the information processing apparatus 10 of the first embodiment.

The server apparatus 100 is a server computer that is installed at a securities exchange 31. The server apparatus 100 receives order messages each indicating a sell order or a buy order from the broker apparatuses including the broker apparatuses 210 and 220. The server apparatus 100 performs matching of sell order and buy order to detect a pair of sell, order and buy order that satisfies a desired condition, and executes the trade. That is, the server apparatus 100 executes the stock trade between the seller making the sell order and the buyer making the buy order. The server apparatus 100 sends a trade execution message to broker apparatuses having sent the order messages with respect to the sell order and the buy order that have been executed.

The broker apparatus 210 is a server computer that is installed at a securities company 32. The broker apparatus 220 is a server computer that is installed at a securities company 33. Securities companies including these securities companies 32 and 33 act as agents for investors including retail investors and institutional investors in execution of stock trading at the securities exchange 31. The broker apparatuses including the broker apparatuses 210 and 220 act as clients for the server apparatus 100 installed at the securities exchange 31 and also act as servers for the client apparatuses including the client apparatuses 230 and 240 used by the investors.

The broker apparatus 210 has an interface to receive stock sell orders and buy orders from client apparatuses, such as the client apparatus 230, used by member investors of the securities company 32. In response to the sell orders and buy orders from these member investors, the broker apparatus 210 sends order messages to the server apparatus 100 and then receives trade execution messages from the server apparatus 100. The broker apparatus 210 outputs order results to the corresponding client apparatuses, such as the client apparatus 230, according to the contents of the received trade execution messages.

Likewise, the broker apparatus 220 has an interface to receive stock sell orders and buy orders from client apparatuses, such as the client apparatus 240, used by member investors of the securities company 33. In response to the sell orders and buy orders from the member investors, the broker apparatus 220 sends order messages to the server apparatus 100 and then receives trade execution messages from the server apparatus 100. The broker apparatus 220 outputs order results to the corresponding client apparatuses, such as the client apparatus 240, according to the contents of the received trade execution messages.

The client apparatuses 230 and 240 are client computers that are used by investors including retail investors and institutional investors. The investors sell and buy stocks by requesting of the securities companies, such as the securities companies 32 and 33. An investor who uses the client apparatus 230 is a member of the securities company 32. The client apparatus 230 sends sell orders and buy orders to the broker apparatus 210 and then receives trade execution notifications from the broker apparatus 210. An investor who uses the client apparatus 240 is a member of the securities company 33. The client apparatus 240 sends sell orders and buy orders to the broker apparatus 220 and then receive trade execution notifications from the broker apparatus 220.

Figure 3:
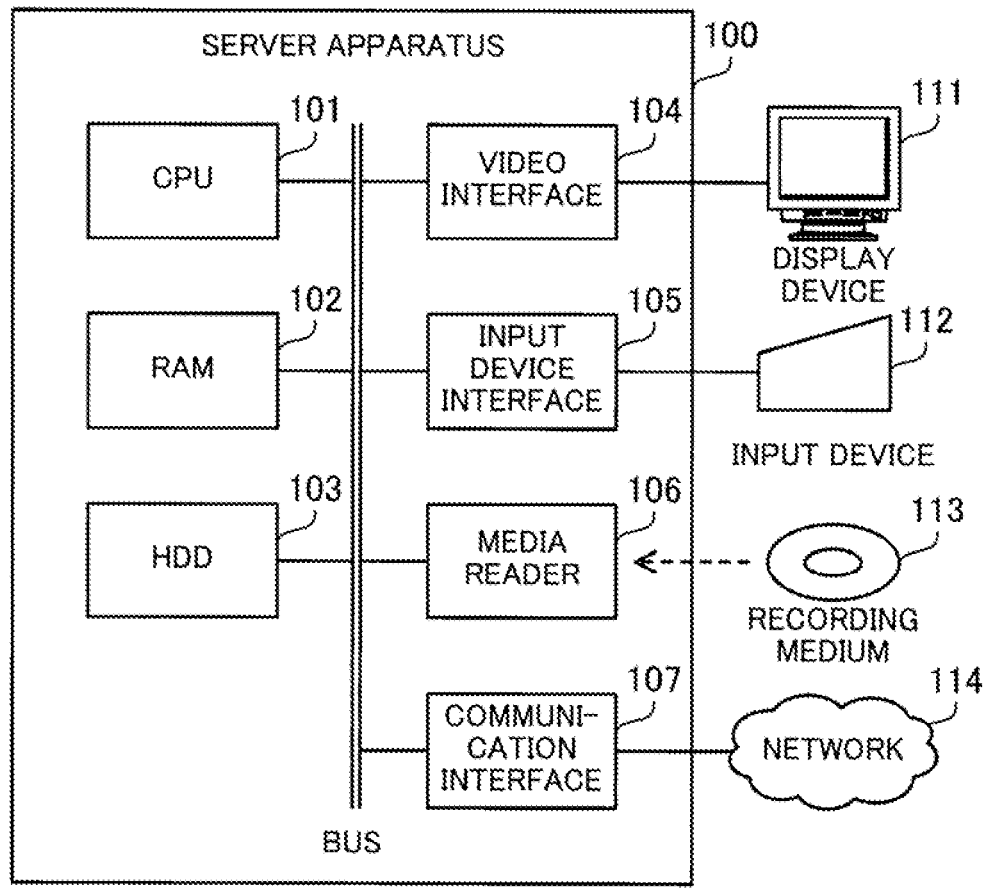
FIG. 3 is a block diagram illustrating an example of a hardware configuration of a server apparatus.

FIG. 3 is a block diagram illustrating an example of a hardware configuration of a server apparatus.

The server apparatus 100 includes a CPU 101, a RAM 102, an HDD 103, a video interface 104, an input device interface 105, a media reader 106, and a communication interface 107. These units are connected to a bus. The CPU 101 corresponds to the processing unit 12 of the first embodiment. The RAM 102 or HDD 103 corresponds to the storage unit 11 of the first embodiment. The broker apparatuses 210 and 220 and client apparatuses 230 and 240 have the same hardware configuration as the server apparatus 100.

The CPU 101 is a processor that executes program instructions. The CPU 101 loads at least part of a program and data from the HDD 103 to the RAM 102 and runs the program. In this connection, the CPU 101 may include a plurality of processor cores. The server apparatus 100 may include a plurality of processors. A set of multiple processors may be called a "multiprocessor," or simply a "processor."

The RAM 102 is a volatile semiconductor memory that temporarily stores a program to be run by the CPU 101 and data to be used by the CPU 101 in processing. In this connection, the server apparatus 100 may include another type of memory than RAM, or may include a plurality of memories.

The HDD 103 is a non-volatile storage device that stores software programs including operating system (OS), middleware and application software, and data. In this connection, the server apparatus 100 may include another type of storage device, such as a flash memory or a solid state drive, or may include a plurality of storage devices.

The video interface 104 outputs videos to a display device 111 connected to the server apparatus 100 in accordance with instructions from the CPU 101. The display device 111 may be a desired type of display device, such as a cathode ray tube (CRT) display, a liquid crystal display (LCD), organic electro-luminescence (OEL) display, or a projector.

The input device interface 105 receives an input signal from an input device 112 connected to the server apparatus 100. As the input device 112, a desired type of input device, such as a mouse, a touch panel, a touch pad, or a keyboard, may be used. In addition, plural types of input devices may be connected to the server apparatus 100.

The media reader 106 is a reading device that reads programs and data from a recording medium 113. Examples of the recording medium 113 include a magnetic disk, such as a flexible disk (FD) and an HDD, an optical disc, such as a compact disc (CD) and a digital versatile disc (DVD), a magneto-optical disk (MO), and a semiconductor memory. The media reader 106 stores a program or data from the recording medium 113 to the RAM 102 or HDD 103.

The communication interface 107 is connected to a network 114 and communicates with the broker apparatuses 210 and 220 over the network 114. The communication interface 107 is a wired interface that is connected to a wired communication device, such as a switch or a router. Alternatively, the communication interface 107 may be a wireless interface that is connected to a wireless communication device, such as a base station or an access point.

The following describes functions of the server apparatus 100.

Figure 4:
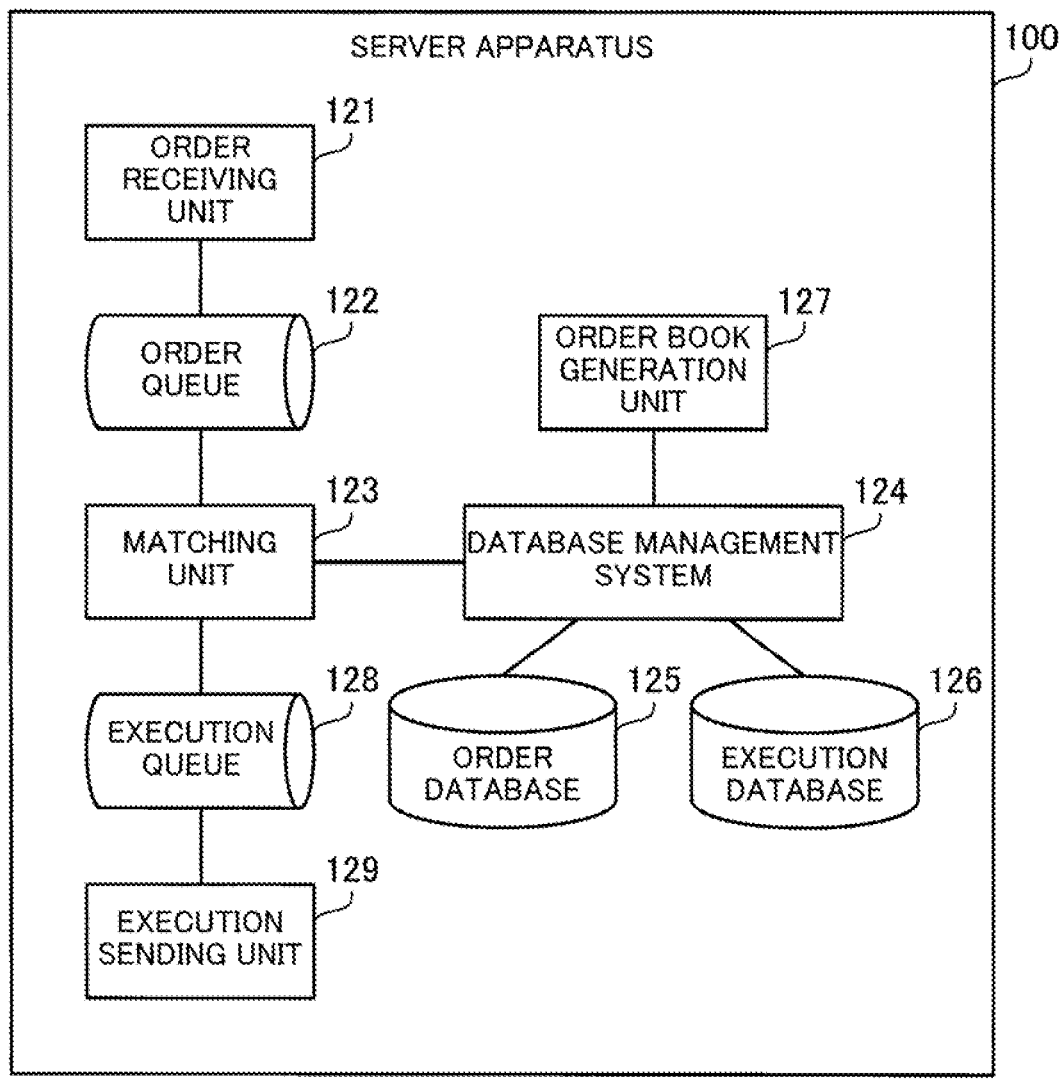
FIG. 4 is a block diagram illustrating an example of functions of the server apparatus.

FIG. 4 is a block diagram illustrating an example of functions of the server apparatus.

The server apparatus 100 includes an order receiving unit 121, an order queue 122, a matching unit 123, a database management system (DBMS) 124, an order database 125, an execution database 126, an order book generation unit 127, an execution queue 128, and an execution sending unit 129.

The database management system 124 used in the server apparatus 100 is an in-memory DBMS that holds data on a primary storage device, such as the RAM 102. Alternatively, a general DBMS that holds data on an auxiliary storage device, such as the HDD 103, may be used. The order queue 122, order database 125, execution database 126, and execution queue 128 are implemented by using storage space in the RAM 102, for example. The order receiving unit 121, matching unit 123, database management system 124, order book generation unit 127, and execution sending unit 129 may be implemented by the CPU 101 running programs, for example.

The order receiving unit 121 receives order messages from broker apparatuses, such as the broker apparatuses 210 and 220. The order receiving unit 121 puts each received order message in the order queue 122.

The order queue 122 is a first-in first-out (FIFO) buffer memory that stores unprocessed order messages in order of receipt. The order receiving unit 121 places the latest order message at the end of the order queue 122. The matching unit 123 extracts the earliest one of the unprocessed order messages at the beginning of the order queue 122.

The matching unit 123 performs matching of sell order and buy order. More specifically, the matching unit 123 extracts the order messages one by one, starting with the one at the beginning of the order queue 122.

In the case where an extracted order message is a sell order, the matching unit 123 compares this sell order with unexecuted ones of buy orders indicated by already extracted order messages. If a buy order satisfying the desired condition is found, the matching unit 123 executes the trade, and puts a trade execution message indicating the pair of sell order and buy order which have been executed, in the execution queue 128. If no buy order satisfying the desired condition is found, the matching unit 123 holds the sell order as an unexecuted sell order.

In the case where the extracted order message is a buy order, the matching unit 123 compares this buy order with unexecuted ones of sell, orders indicated by already extracted order messages. If a sell order satisfying the desired condition is found, the matching unit 123 executes the trade, and puts a trade execution message indicating the pair of sell order and buy order which have been executed, in the execution queue 128. If no sell order satisfying the desired condition is found, the matching unit 123 holds the buy order as an unexecuted buy order.

To implement the above trade processing, the matching unit 123 uses a relational database. The matching unit 123 issues SQL statements that are queries against the relational database, to the database management system 124, and then obtains processing results for the SQL statements from the database management system 124. The SQL statements that the matching unit. 123 issues to the database management system 124 include a search query for searching a table to find records satisfying a specified condition, an insertion query for inserting a new record in the table, an update query for rewriting a value in a specified existing record in the table, and a deletion query for deleting a specified record from the table.

The database management system 124 manages the order database 125 and execution database 126. The database management system 124 receives SQL statements that are queries against the relational database, and processes the order database 125 and execution database 126 in accordance with the received SQL statements. The database management system 124 outputs processing results to the senders of the SQL statements. The SQL statements that the database management system 124 receives include a search query, an insertion query, an update query, and a deletion query. In this connection, the database management system 124 receives such SQL statements from the matching unit 123 and the order book generation unit 127.

The order database 125 contains a sell order table that indicates unexecuted sell orders for each stock name. The order database 125 also contains an index so as to enable a fast record search based on a value of a specified column in the sell order table. In addition, the order database 125 contains a buy order table that indicates unexecuted buy orders for each stock name. The order database 125 also contains an index so as to enable a fast record search based on a value of a specified column in the buy order table.

The execution database 126 contains a sell execution table that indicates executed sell orders for each stock name. In addition, the execution database 126 contains a buy execution table that indicates executed buy orders for each stock name. In this connection, the second embodiment mainly describes data processing using the order database 125.

The order book generation unit 127 generates order book information indicating the accumulated state of unexecuted sell orders and unexecuted buy orders for each stock name. To generate the order book information, the order book generation unit 127 issues a search query to the database management system 124, and obtains a processing result indicating the quantity of the sell orders and the quantity of the buy orders from the database management system 124. The order book information is helpful for investors to know about the current market price (present price) and probable prices for trade execution. The order book generation unit 127 may send the generated order book information to the securities companies, such as the securities companies 32 and 33, or may send it to a variety of information providing systems that display investment information.

The execution queue 128 is a FIFO buffer memory that stores therein unsent trade execution messages in order of generation. The matching unit 123 places the latest trade execution message at the end of the execution queue 128. The execution sending unit 129 extracts the earliest one of the unsent trade execution messages at the beginning of the execution queue 128.

The execution sending unit 129 extracts trade execution messages one by one, starting with the one at the beginning of the execution queue 128. The execution sending unit 129 sends the extracted trade execution message to the broker apparatus of a securities company that is a destination of the trade execution message, among the securities companies including the securities companies 32 and 33. The destination securities company is a company which made the sell order or buy order which has been executed.

FIG. 5 is a view illustrating an example of an order message.

The order message 131 is stored in the order queue 122. The order message 131 has the following items: trading type, limit price, quantity, order date and time, order number, security code, and requesting source.

The trading type is represented as a flag for distinguishing sell order and buy order. A trading type of "1" indicates a buy order, whereas a trading type of "2" indicates a sell order. The limit price indicates a condition for a trade price specified by an investor. In the case of a sell order, the limit price indicates a lower limit of the trade price to request a trade at a selling price higher than or equal to the limit price. In the case of a buy order, the limit price indicates an upper limit of the trade price to request a trade at a buying price lower than or equal to the limit price. Such a limit price does not need to be set. An order with a limit price is called a limit order, and an order without a limit price is called a market order. The limit order is executed only when there is a partner order that satisfies a specified price condition (a partner order is a buy order for sell order or is a sell order for buy order). The market order is executed when any partner order is found.

The quantity indicates the number of shares that are desired to be traded in the single order. In this connection, the order indicated by the order message 131 may partially be executed in advance only for a partial quantity among the specified quantity. The order date and time indicate the date and time of the order. The order number is an identification number identifying the order. The order number is an increasing integer. A smaller order number is given to an earlier order, and a larger order number is given to a later order. When the server apparatus 100 receives a new order message 131, the order receiving unit 121 may give an order number to the order message 131. The security code is an identification number identifying a stock name. The requesting source is represented as a character string and indicates a securities company whose broker apparatus has sent the order message 131.

FIG. 6 is a view illustrating an example of order book information.

The order book information 132 is generated by the order book generation unit 127 on the basis of the order database 125. The order book information 132 indicates the accumulated state of unexecuted sell orders and unexecuted buy orders for a certain stock name. The order book information 132 has the following items: indicative price, sell volume, and buy volume.

The indicative price is a stock price for the stock name and corresponds to a limit price for sell orders and buy orders. The sell volume is the total quantity resulting from the sum of quantities requested by sell orders specifying a certain indicative price as a limit price. That is, for each limit price, the sell volume indicates the total number of remaining shares desired to be sold at the limit price. The buy volume is the total quantity resulting from the sum of quantities requested by buy orders specifying a certain indicative price as a limit price. That is, for each limit price, the buy volume indicates the total, number of remaining shares desired to be bought at the limit price. As an example, the order book information 132 of FIG. 6 indicates that the following sell orders remain: 21900 shares priced at 9000 yen, 69700 shares priced at 8900 yen, 1100 shares priced at 8800 yen, 5300 shares priced at 8700 yen, and 200 shares priced at 8600 yen. In addition, the order book information 132 indicates that the following buy orders remain: 400 shares priced at 8500 yen, 1600 shares priced at 8400 yen, 900 shares priced at 8300 yen, and 18200 shares priced at 8200 yen.

As a general rule, matching of sell order and buy order is performed on the basis of the limit prices. When a new order arrives, a partner order that is most profitable for the new order is preferentially selected as a trading partner from partner orders satisfying the limit price of the new order. More specifically, when a new sell order arrives, one or more buy orders are selected preferentially in descending order of buying price as trading partner (s) from buy orders with buying prices higher than or equal to the limit price of the sell order. By contrast, when a new buy order arrives, one or more sell orders are selected preferentially in ascending order of selling price as trading partner(s) from sell orders with selling prices lower than or equal to the limit price of the buy order. In this connection, if there are a plurality of partner orders with the same trade price, one or more partner orders are selected preferentially in chronological order of order date and time.

Refer to the example of FIG. 6. For example, when a buy order of 100 shares at 8600 yen arrives, one or more sell orders totaling 100 shares are selected in chronological order of order date and time as trading partner (s) from the sell orders totaling 200 shares at 8600 yen, and the trade is executed. Therefore, the sell volume for 8600 yen is reduced to 100 shares. When a buy order of 500 shares at 8600 yen arrives, the sell orders totaling 200 shares at 8600 yen are taken as trading partners, and the trade is executed. However, a trade for 300 shares of the buy order is not executed but remains. Therefore, the sell volume for 8600 yen is reduced to zero share, and the buy volume for 8600 yen is increased to 300 shares.

When a buy order of 100 shares at 8700 yen arrives, one or more sell orders totaling 100 shares are selected in chronological order of order date and time as trading partner (s) from the sell orders totaling 200 shares at 8600 yen, and the trade is executed. Therefore, the sell volume for 8600 yen is reduced to 100 shares. When a buy order of 500 shares at 8700 yen arrives, the sell orders totaling 200 shares at 8600 yen are taken as trading partners, and one or more sell orders totaling 300 shares at 8700 yen are selected in chronological order of order date and time as trading partner (s) from the sell orders totaling 5300 shares at 8700 yen, and the trade is executed. Therefore, the sell volume for 8600 yen is reduced to zero share and the sell volume for 8700 yen is reduced to 5000 shares.

When a sell order of 100 shares at 8500 yen arrives, one or more buy orders totaling 100 shares are selected in chronological order of order date and time as trading partner (s) from the buy orders totaling 400 shares at 8500 yen, and the trade is executed. Therefore, the buy volume for 8500 yen is reduced to 300 shares. When a sell order of 500 shares at 8500 yen arrives, the buy orders totaling 400 shares at 8500 yen are taken as trading partners, and the trade is executed. However, a trade for 100 shares of the sell order is not executed but remains. Therefore, the buy volume for 8500 yen is reduced to zero share and the sell volume for 8500 yen is increased to 100 shares.

When a sell order of 100 shares at 8400 yen arrives, one or more buy orders totaling 100 shares are selected in chronological order of order date and time as trading partner (s) from the buy orders totaling 400 shares at 8500 yen, and the trade is executed. Therefore, the buy volume for 8500 yen is reduced to 300 shares. When a sell order of 500 shares at 8400 yen arrives, the buy orders totaling 400 shares at 8500 yen are taken as trading partners, one or more buy orders totaling 100 shares are selected in chronological order of order date and time as trading partner (s) from the buy orders totaling 1600 shares at 8400 yen, and the trade is executed. Therefore, the buy volume for 8500 yen is reduced to zero share and the buy volume for 8400 yen is reduced to 1500 shares.

By the way, to get a profit from stock price changes, some investors make sell orders with a limit price greatly exceeding the present price or buy orders with a limit price greatly below the present price. Therefore, the sell volume has a wide distribution from the present price toward a higher limit price, whereas the buy volume has a wide distribution from the present price toward a lower limit price. In the stock trading during normal time, there do not come many buy orders that specify a limit price greatly exceeding the present price, and there do not come many sell orders that specify a limit price greatly below the present price. Therefore, in the stock trading during the normal time, in determining a trading partner for an arriving order, there are a relatively small number of candidate trading partners that satisfy the price condition, and therefore the database search imposes a relatively low load.

However, if investment information for a corporation that greatly influences investors' evaluation of the corporation is published, the stock trading would be carried out in panic. If investors expect an increase in the corporation's value, buy orders with a limit price greatly exceeding the present price would arrive. If investors expect a fall in the corporation's value, sell orders with a limit price greatly below the present price would arrive. Therefore, in determining a trading partner for each arriving order in the stock trading in panic, there would be many candidate trading partners that satisfy the price condition, and therefore the database search imposes a high load.

That is, if a buy order with a limit price greatly exceeding the present price arrives, many sell orders with selling prices falling between the present price and the limit price of the buy order would be found as candidate trading partners. In addition, if a sell order with a limit price greatly below the present price arrives, many buy orders with buying prices falling between the present price and the limit price of the sell order would be found as candidate trading partners. Refer now to the example of FIG. 6. For example, when a buy order with a limit price of 9000 yen arrives, sell orders totaling 98200 shares priced at selling prices between 8600 yen and 9000 yen are found as candidate trading partners. As another example, when a sell order with a limit price of 8200 yen arrives, buy orders totaling 21100 shares priced at buying prices between 8500 yen and 8200 yen are found as candidate trading partners.

To deal with this, the server apparatus 100 of the second embodiment uses modified indexes corresponding to the sell order table and the buy order table, as will be described later, thereby accelerating the database search.

FIG. 7 is a view illustrating an example of a sell order table.

The sell order table 133 is contained in the order database 125. The sell order table 133 lists unexecuted sell orders for a certain stock name. The sell order table 133 has the following items: selling price, quantity, order date and time, order number, security code, and requesting source. A single record registered in the sell order table 133 corresponds to an order message indicating a sell order among order messages extracted from the order queue 122, i.e., an order message with trading type of 2. The selling price corresponds to the limit price of the order message 131 illustrated in FIG. 5. The quantity, order date and time, order number, security code, and requesting source correspond to the quantity, order date and time, order number, security code, and requesting source included in the order message 131, respectively. In this connection, with respect to a sell order, the quantity registered in the sell order table 133 may be less than the quantity originally requested by the sell order because the sell order may have partially been executed.

As an example, the sell order table 133 contains sell orders of 100 shares and 100 shares, both priced at 8600 yen. The sell order table 133 also contains sell orders of 1000 shares, 300 shares, 1500 shares, 500 shares, and 1000 shares, all priced at 8700 yen. For each selling price, the sum of quantities in the sell order table 133 is computed and used as the sell volume in the order book information 132. In the case where a new sell order of 200 shares at 8600 yen arrives, no buy order is found as a trading partner, and therefore a record indicating the new sell order is registered in the sell order table 133.

FIG. 8 is a view illustrating an example of a buy order table.

The buy order table 134 is contained in the order database 125. The buy order table 134 lists unexecuted buy orders for a certain stock name. The buy order table 134 has the following items: buying price, quantity, order date and time, order number, security code, and requesting source. A single record registered in the buy order table 134 corresponds to an order message indicating a buy order among order messages extracted from the order queue 122, i.e., an order message with trading type of 1. The buying price corresponds to the limit price of the order message 131 illustrated in FIG. 5. The quantity, order date and time, order number, security code, and requesting source correspond to the quantity, order date and time, order number, security code, and requesting source included in the order message 131, respectively. In this connection, with respect to a buy order, the quantity registered in the buy order table 134 may be less than the quantity originally requested by the buy order because the buy order may have partially been executed.

As an example, the buy order table 134 contains buy orders of 100 shares, 200 shares, and 100 shares, all priced at 8500 yen. Further, the buy order table 134 contains buy orders of 500 shares, 100 shares, and 1000 shares, all priced at 8400 yen. Still further, the buy order table 134 contains a buy order of 100 shares priced at 8300 yen. For each buying price, the sum of quantities in the buy order table 134 is computed and used as the buy volume in the order book information 132. In the case where a new buy order of 200 shares at 8500 yen arrives, a record indicating the new buy order is registered in the buy order table 134.

A record indicating an executed sell order is deleted from the sell order table 133. The sell execution table in the execution database 126 may contain the same information as the sell order table 133 with respect to executed sell orders. In addition, a record indicating an executed buy order is deleted from the buy order table 134. The buy execution table in the execution database 126 may contain the same information as the buy order table 134 with respect to executed buy orders. The following description of the second embodiment focuses on database operations such as search, insertion, update, deletion, etc., of records on the sell order table 133 and buy order table 134, and database operations for the sell execution table and buy execution table will not be described.

To accelerate deletion of a record from the sell order table 133, a deletion flag indicating whether the record has been deleted may be added to the record. This eliminates the need of actually deleting the record from the sell order table 133. A record with a deletion flag of ON among the records in the sell order table 133 is considered as not existing in the sell order table 133. Likewise, to accelerate deletion of a record from the buy order table 134, a deletion flag indicating whether the record has been deleted may be added to the record. A record with a deletion flag of ON among the records in the buy order table 134 is considered as not existing in the buy order table 134.

By the way, the order number is used as a primary key column for uniquely identifying a record in the sell order table 133. The order number is an increasing integer that is given to a sell order in chronological order of order date and time. The order number is also used as a basis for sorting a plurality of records in chronological order. Therefore, a primary index that enables quickly locating, based on an order number, a record with the order number is created from the sell order table 133. The primary index is contained in the order database 125. In addition, the sell order table 133 is often used for narrowing down records by using a selling price as a search condition. Therefore, a selling price index that enables quickly locating, based on a selling price, records with the selling price is created from the sell order table 133. The selling price index is also contained in the order database 125.

Likewise, the order number is used as a primary key column for uniquely identifying a record in the buy order table 134. A primary index that enables quickly locating, based on an order number, a record with the order number is created from the buy order table 134. The primary index is contained in the order database 125. In addition, the buy order table 134 is often used for narrowing down records by using a buying price as a search condition. Therefore, a buying price index that enables quickly locating, based on a buying price, records with the buying price is created from the buy order table 134. The buying price index is also contained in the order database 125.

The following describes the structures of the selling price index and buying price index.

Figure 9:
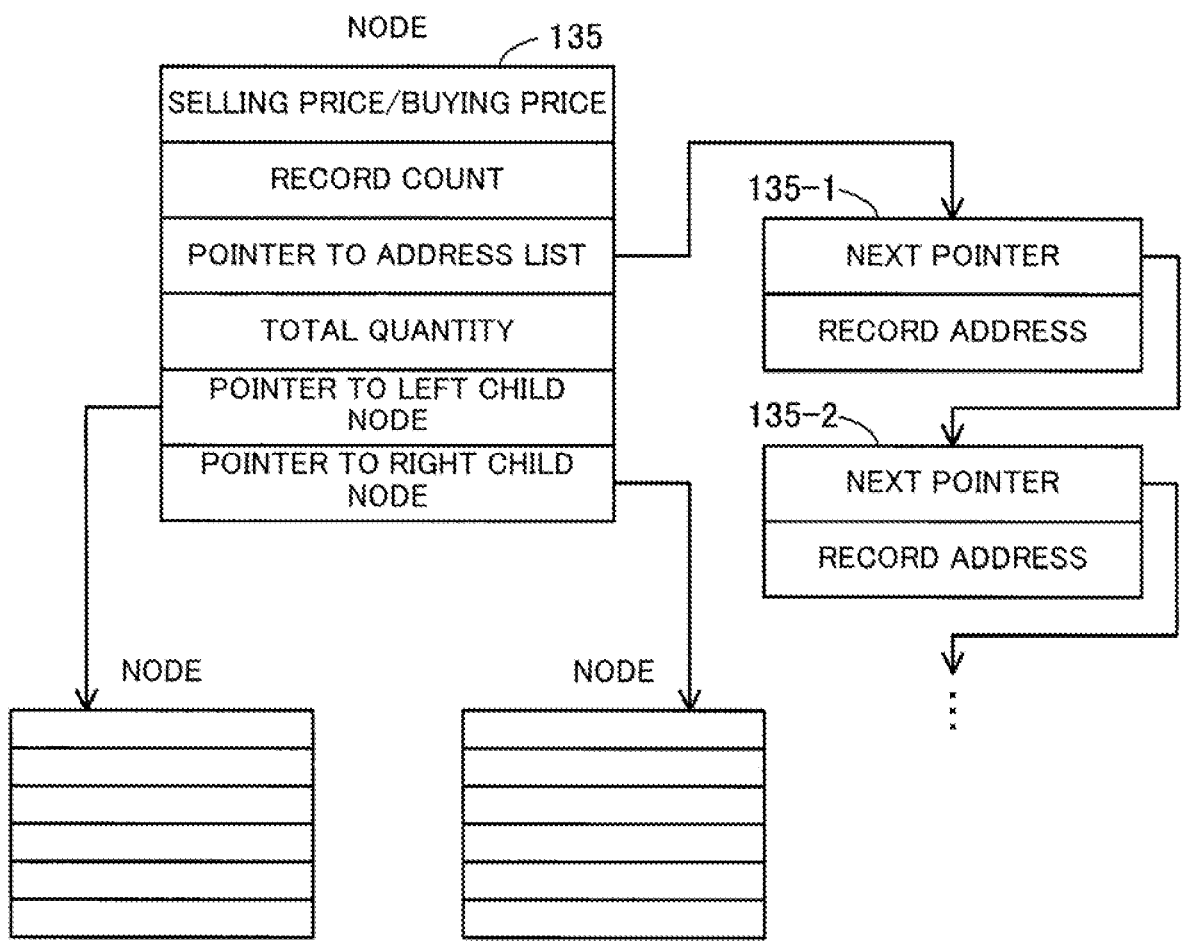
FIG. 9 is a view illustrating an example of a data structure of an index.

FIG. 9 is a view illustrating an example of a data structure of an index.

The selling price index and buying price index have B-tree structure, in which a plurality of nodes are connected in a tree structure. In this connection, the selling price index and buying price index may be configured in a tree structure other than B-tree or in a data structure other than tree structures. In addition, the following describes a selling price index and a buying price index that have a binary tree in which each node has two child nodes. Alternatively, each node may have three or more child nodes.

A node 135 is an example of nodes included in the selling price index or buying price index. The node 135 has selling price or buying price, record count, pointer to address list, total quantity, pointer to left child node, and pointer to right child node.

In the case where the node 135 is a node of the selling price index, the selling price in the node 135 is a value that is used in the selling price column in the sell order table 133. The record count indicates the number of records with the selling price among the records registered in the sell order table 133. The pointer to address list points to an address list listing the addresses of the records with the selling price among the records registered in the sell order table 133. For example, the pointer to address list points to a list element 135-1 at the beginning of the address list. The list element 135-1 has the address of a first record with the selling price and a next pointer pointing to a second list element 135-2. The list element 135-2 has the address of a second record with the selling price and a next pointer pointing to the third list element. In this way, the addresses of a plurality of records are listed in the list structure. In this connection, the addresses of the plurality of records may be listed in another data structure, such as an array, instead of the list structure.

The total quantity is the sum of quantities indicated in the records with the selling price among the records registered in the sell order table 133. As described later, the use of the selling price index including the total quantity for each selling price enables fast matching of sell order and buy order. The pointer to left child node points to the left child node with a selling price lower than that of the node 135. The pointer to right child node points to the right child node with a selling price higher than that of the node 135.

Each time a record is inserted in or deleted from the sell order table 133, the record count, address list, and total, quantity in a node corresponding to the selling price of the record are updated. When a record is inserted in the sell order table 133, the record count is incremented by one, the address of the record is registered in the address list, and the total quantity is increased by the quantity indicated in the record. When a record is deleted from the sell order table 133, the record count is decremented by one, the address of the record is deleted from the address list, and the total quantity is reduced by the quantity indicated in the record.

In the case where the node 135 is a node of the buying price index, the buying price in the node 135 is a value that is used in the buying price column in the buy order table 134. The record count indicates the number of records with the buying price among the records registered in the buy order table 134. The pointer to address list points to an address list listing the addresses of the records with the buying price among the records registered in the buy order table 134. The total quantity is the sum of quantities indicated in the records with the buying price among the records registered in the buy order table 134. The pointer to left child node points to the left child node with a buying price lower than that of the node 135. The pointer to right child node points to the right child node with a buying price higher than that of the node 135.

Each time a record is inserted in or deleted from the buy order table 134, the record count, address list, and total quantity in a node corresponding to the buying price of the record are updated. When a record is inserted in the buy order table 134, the record count is incremented by one, the address of the record is registered in the address list, and the total quantity is increased by the quantity indicated in the record. When a record is deleted from the buy order table 134, the record count is decremented by one, the address of the record is deleted from the address list, and the total quantity is reduced by the quantity indicated in the record.

In this connection, in the second embodiment, the matching unit 123 often uses the total quantity. Therefore, the total quantity is registered in the node 135. In this connection, a statistical value other than the total quantity may be registered in the node 135 according to an application using the database management system 124. For example, SQL statements may use, other than a function SUM for obtaining the sum, a function MAX for obtaining the maximum value, a function MIN for obtaining the minimum value, a function AVG for obtaining the average, or another as a set function that computes one value from a plurality of records. Accordingly, the maximum quantity, the minimum quantity, the average quantity, or another may be registered in the node 135. In addition, although the second embodiment has described the case where a statistical value with respect to the quantity column is registered, a statistical value with respect to another column may be registered.

Figure 10:
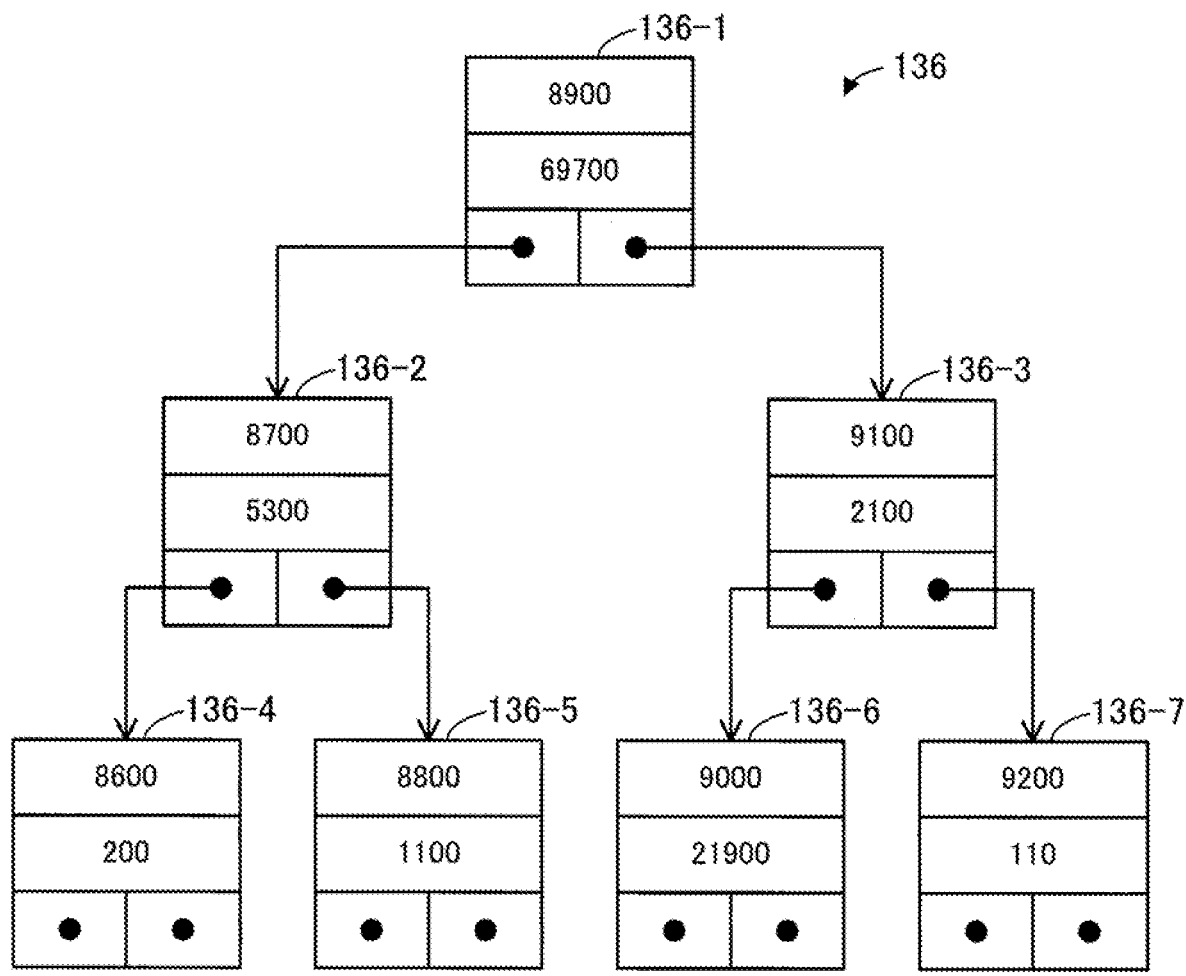
FIG. 10 is a view illustrating an example of a selling price index for the sell order table.

FIG. 10 is a view illustrating an example of the selling price index for the sell order table.

The selling price index 136 is created from the sell order table 133. The use of the selling price index 136 accelerates narrowing down, by selling price, records indicating unexecuted sell orders for a certain stock name. The selling price index 136 includes nodes 136-1 to 136-7.

The node 136-1 has an address list listing the addresses of records with a selling price of 8900 yen and indicates that the total quantity obtained from the listed records is 69700 shares. The node 136-2 has an address list listing the addresses of records with a selling price of 8700 yen and indicates that the total quantity obtained from the listed records is 5300 shares. The node 136-3 has an address list listing the addresses of records with a selling price of 9100 yen and indicates that the total quantity obtained from the listed records is 2100 shares.

The node 136-4 has an address list listing the addresses of records with a selling price of 8600 yen and indicates that the total quantity obtained from the listed records is 200 shares. The node 136-5 has an address list listing the addresses of records with a selling price of 8800 yen and indicates that the total, quantity obtained from the listed records is 1100 shares. The node 136-6 has an address list listing the addresses of records with a selling price of 9000 yen and indicates that the total quantity obtained from the listed records is 21900 shares. The node 136-7 has an address list listing the addresses of records with a selling price of 9200 yen and indicates that the total quantity obtained from the listed records is 110 shares.

In this connection, the database management system 124 carries out a binary search on the nodes included in the selling price index 136 to find a node with a desired selling price. First, the database management system 124 compares the desired selling price with the selling price indicated in the root node. If the desired selling price is lower than the selling price indicated in the root node, the search moves to the left child node. If the desired selling price is higher than the selling price indicated in the root node, the search moves to the right child node. The database management system 124 continues the search by moving to a left child node or right child node until a node with the desired selling price is found.

Figure 11:
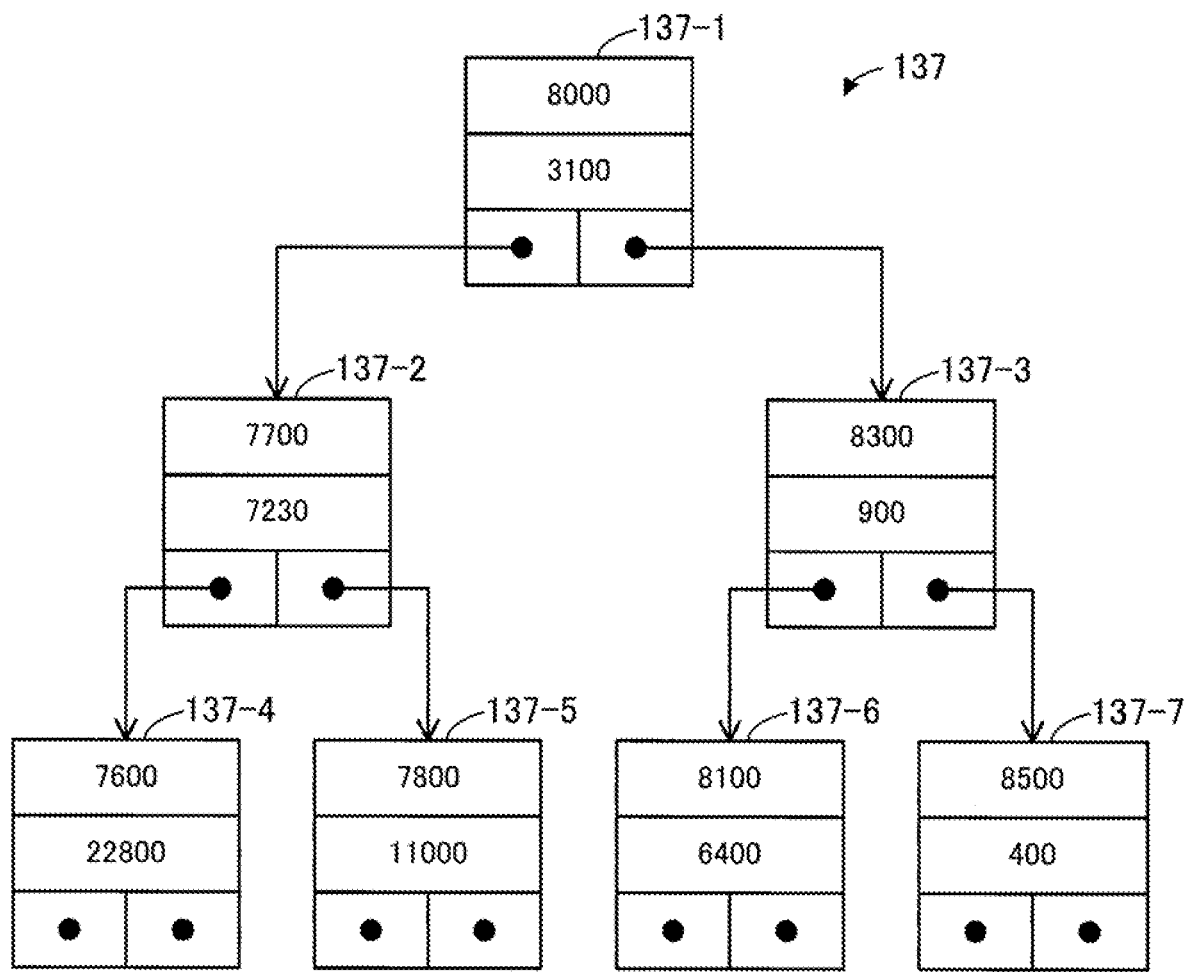
FIG. 11 is a view illustrating an example of a buying price index for the buy order table.

FIG. 11 is a view illustrating an example of a buying price index for the buy order table.

The buying price index 137 is created from the buy order table 134. The use of the buying price index 137 accelerates narrowing down, by buying price, records indicating unexecuted buy orders for a certain stock name. The buying price index 137 includes nodes 137-1 to 137-7.

The node 137-1 has an address list listing the addresses of records with a buying price of 8000 yen and indicates that the total quantity obtained from the listed records is 3100 shares. The node 137-2 has an address list listing the addresses of records with a buying price of 7700 yen and indicates that the total quantity obtained from the listed records is 7230 shares. The node 137-3 has an address list listing the addresses of records with a buying price of 8300 yen and indicates that the total quantity obtained from the listed records is 900 shares.

The node 137-4 has an address list listing the addresses of records with a buying price of 7600 yen and indicates that the total quantity obtained from the listed records is 22800 shares. The node 137-5 has an address list listing the addresses of records with a buying price of 7800 yen and indicates that the total quantity obtained from the listed records is 11000 shares. The node 137-6 has an address list listing the addresses of records with a buying price of 8100 yen and indicates that the total quantity obtained from the listed records is 6400 shares. The node 137-7 has an address list listing the addresses of records with a buying price of 8500 yen and indicates that the total quantity obtained from the listed records is 400 shares.

In this connection, the database management system 124 carries out a binary search on the nodes included in the buying price index 137 to find a node with a desired buying price.

FIG. 12 is a view illustrating an example of a table definition file.

The table definition file 138 is contained in the order database 125 in advance. The database management system 124 creates the sell order table 133, buy order table 134, selling price index 136, and buying price index 137 with reference to the table definition file 138 at the time of start-up.

The table definition file 138 includes SQL statements that define the structure of the sell order table 133 and the structure of the selling price index 136. The sell order table 133 is defined to have the following columns: selling price of integer type, quantity of integer type, order date and time of character string type, order number of integer type, security code of integer type, and requesting source of character string type. Further, the order number in the sell order table 133 is defined as a primary key. Still further, the selling price index 136 is defined to be created with respect to the selling price column of the sell order table 133 and to have a value obtained by applying the sum function SUM to the quantity column of the sell order table 133.

In addition, the table definition file 138 includes SQL statements that define the structure of the buy order table 134 and the structure of the buying price index 137. The buy order table 134 is defined to have the following columns:

buying price of integer type, quantity of integer type, order date and time of character string type, order number of integer type, security code of integer type, and requesting source of character string type. Further, the order number in the buy order table 134 is defined as a primary key. Still further, the buying price index 137 is defined to be created with respect to the buying price column of the buy order table 134 and to have a value obtained by applying the sum function SUM to the quantity column of the buy order table 134.

The following describes a series of SQL statements that are issued to the database management system 124 when the matching unit 123 carries out matching of sell order and buy order.

Figure 13:
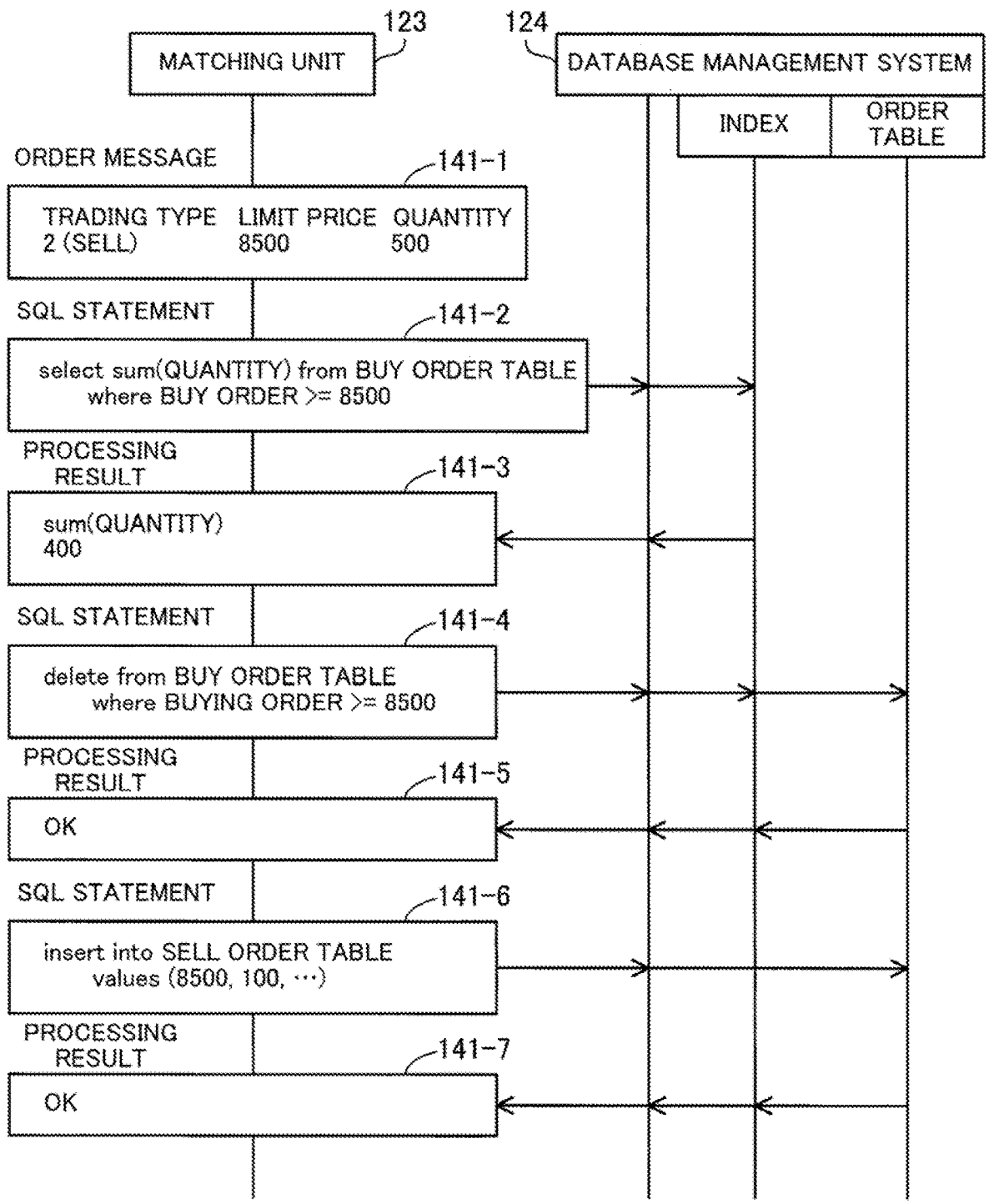
FIG. 13 is a view illustrating a first example of processing a query for a sell order.

FIG. 13 is a view illustrating a first example of processing a query for a sell order.

The matching unit 123 extracts an order message 141-1 from the order queue 122. The order message 141-1 indicates a sell order of 500 shares at 8500 yen. Then, the matching unit 123 issues an SQL statement 141-2 to the database management system 124. The SQL statement 141-2 is a search query for searching the buy order table 134 to find records with buying prices of 8500 yen or more and obtaining the total sum quantity from the found records.

When receiving the SQL statement 141-2, the database management system 124 searches the buying price index 137 to find nodes with the buying prices of 8500 yen or more and obtains the total sum quantity from the found nodes. At this time, the database management system 124 does not need to access the buy order table 134. The database management system 124 returns a processing result 141-3 for the SQL statement 141-2 to the matching unit 123. The processing result 141-3 indicates that the total sum quantity obtained in response to the SQL statement 141-2 is 400 shares.

Since the processing result 141-3 indicates 400 shares that are less than the 500 shares requested by the order message 141-1, the matching unit 123 determines to take all records satisfying the search condition described in the SQL statement 141-2 as trading partners. Then, the matching unit 123 issues an SQL statement 141-4 to the database management system 124. The SQL statement 141-4 is a deletion query for deleting the records with the buying prices of 8500 yen or more from the buy order table 134.

When receiving the SQL statement 141-4, the database management system 124 searches the buying price index 137 to find nodes with the buying prices of 8500 yen or more, and specifies the records in the buy order table 134, from the found nodes. The database management system 124 deletes the specified records from the buy order table 134. In addition, the database management system 224 updates the buying price index 137 so as to reflect the deletion of the records. The database management system 124 returns a processing result 141-5 for the SQL statement 141-4 to the matching unit 123. The processing result 141-5 indicates that the records have been deleted successfully.

Since a trade of 100 shares out of the 500 shares requested by the order message 141-1 is not executed, the matching unit 123 issues an SQL statement 141-6 to the database management system 124. The SQL statement 141-6 is an insertion query for inserting a record indicating a sell order of 100 shares at a selling price of 8500 yen in the sell order table 133. When receiving the SQL statement 141-6, the database management system 124 inserts the record in the sell order table 133 and updates the selling price index 136 so as to reflect the insertion of the record. The database management system 124 returns a processing result 141-7 for the SQL statement 141-6 to the matching unit 123. The processing result 141-7 indicates that the record has been inserted successfully. The order processing of the sell order indicated by the order message 141-1 is now complete.

Figure 14:
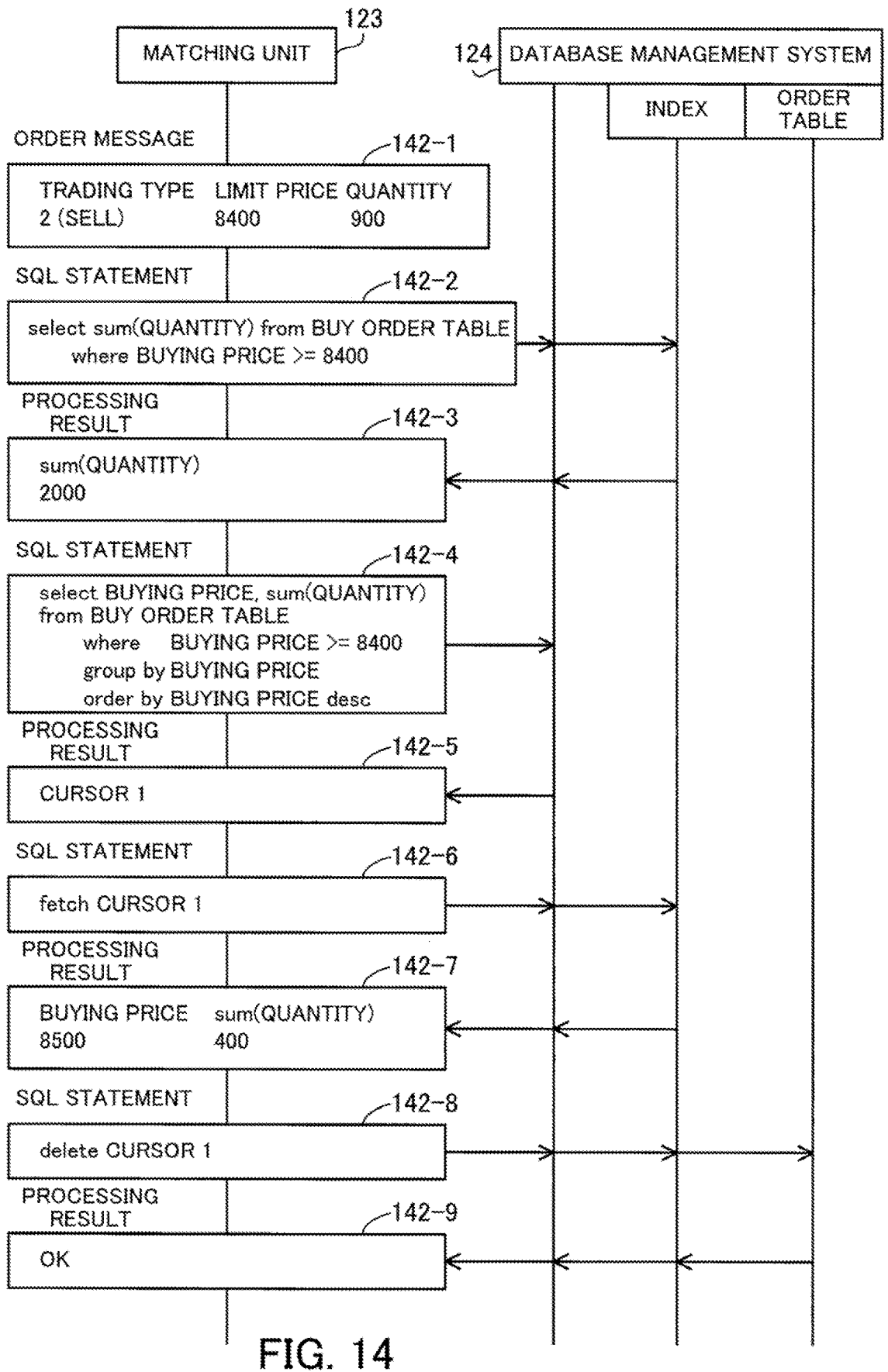
FIG. 14 is a view illustrating a second example of processing a query for a sell order.

FIG. 14 is a view illustrating a second example of processing a query for a sell order.

The matching unit 123 extracts an order message 142-1 from the order queue 122. The order message 142-1 indicates a sell order of 900 shares at 8400 yen. Then, the matching unit 123 issues an SQL statement 142-2 to the database management system 124. The SQL statement 142-2 is a search query for searching the buy order table 134 to find records with buying prices of 8400 yen or more and obtaining the total, sum quantity from the found records.

When receiving the SQL statement 142-2, the database management system 124 searches the buying price index 137 to find nodes with the buying prices of 8400 yen or more and obtains the total sum quantity from the found nodes. At this time, the database management system 124 does not need to access the buy order table 134. The database management system 124 returns a processing result 142-3 for the SQL statement 142-2 to the matching unit 123. The processing result 142-3 indicates that the total sum quantity obtained in response to the SQL statement 142-2 is 2000 shares.

Since the processing result 142-3 indicates 2000 shares that exceeds the 900 shares requested by the order message 142-1, the matching unit 123 determines to narrow down corresponding records by buying price to take some of them as trading partners. Then, the matching unit 123 issues an SQL statement 142-4 to the database management system 124. The SQL statement 142-4 is a search query for searching the buy order table 134 to find records with the buying prices of 8400 yen or more, obtaining the total quantity from the found records for each buying price, and sorting the total quantities in descending order of buying price.

When receiving the SQL statement 142-4, the database management system 124 opens a cursor (cursor 1) for fetching the search result row by row, and returns a processing result 142-5 indicating the cursor 1 to the matching unit 123.

The matching unit 123 issues an SQL statement 142-6 for fetching the next row of the search result to the database management system 124 using the cursor 1 indicated in the processing result 142-5. When receiving the SQL statement 142-6, the database management system 124 searches the buying price index 137 to find a node with the highest buying price of 8500 yen, and retrieves the total quantity from the found node. At this time, the database management system 124 does not need to access the buy order table 134. The database management system 124 returns a processing result 142-7 for the SQL statement 142-6 to the matching unit 123. The processing result 142-7 indicates that the buying price is 8500 yen and the total quantity is 400 shares.

Since the processing result 142-7 indicates 400 shares that are less than the 900 shares requested by the order message 142-1, the matching unit 123 determines to take all records with the buying price of 8500 yen as trading partners. Then, the matching unit 123 issues an SQL statement 142-8 to the database management system 124. The SQL statement 142-8 is a deletion query for deleting the records indicated in the processing result 142-7 from the buy order table 134.

When receiving the SQL statement 142-8, the database management system 124 searches the buying price index 137 to find a node with the buying price of 8500 yen, and specifies the records in the buy order table 134, from the found node. The database management system 124 deletes the specified records from the buy order table 134. In addition, the database management system 124 updates the buying price index 137 so as to reflect the deletion of the records. The database management system 124 returns a processing result 142-9 for the SQL statement 142-8 to the matching unit 123. The processing result 142-9 indicates that the records have been deleted successfully.

Figure 15:
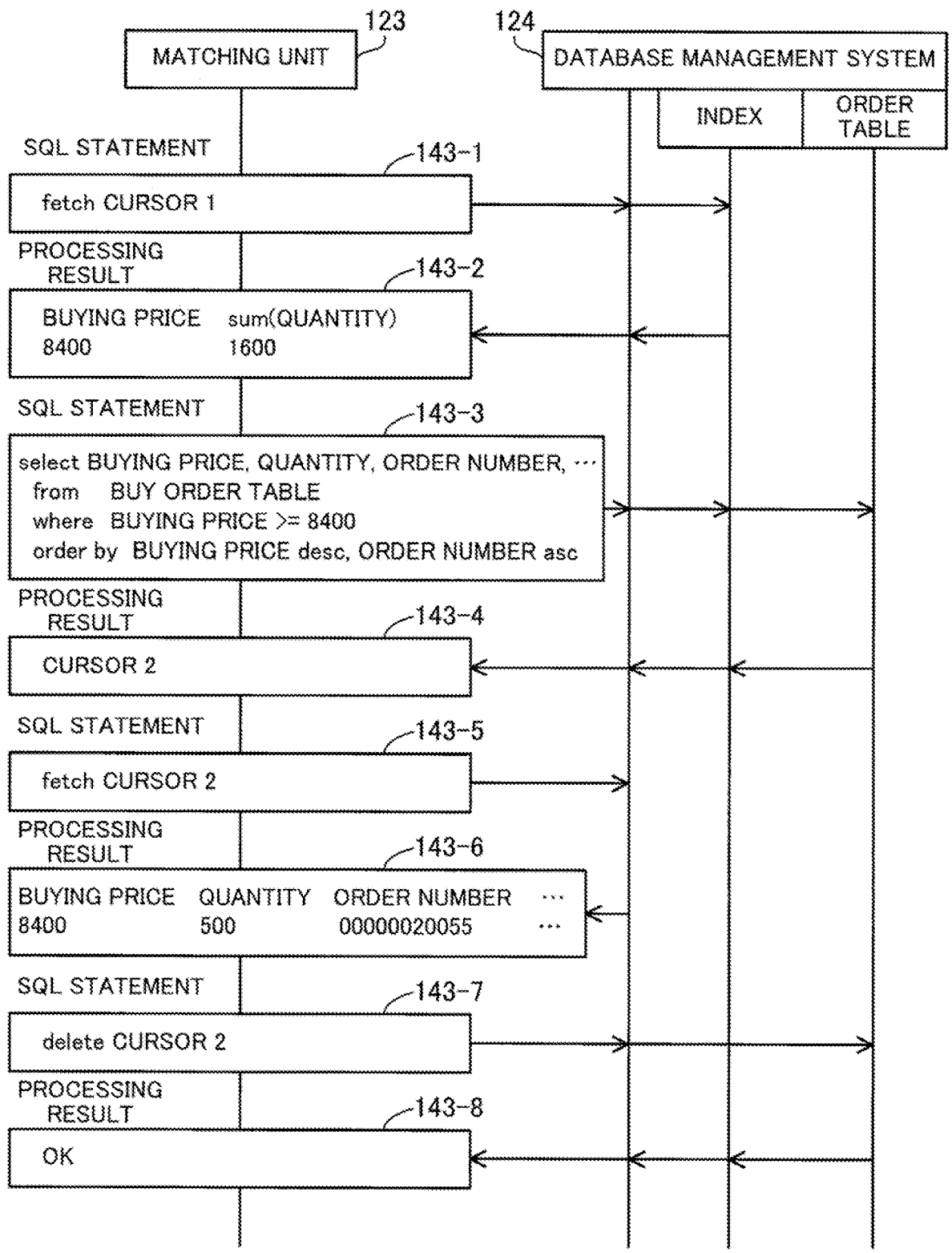
FIG. 15 is a view illustrating the second example of processing the query for the sell order (continued)

FIG. 15 is a view illustrating the second example of processing the query for the sell order (continued).

The matching unit 123 issues an SQL statement 143-1 for fetching the next row of the search result to the database management system 124 using the cursor 1 indicated in the processing result 142-5. When receiving the SQL statement 143-1, the database management system 124 searches the buying price index 137 to find a node with the next highest buying price of 8400 yen and retrieves the total quantity from the found node. At this time, the database management system 124 does not need to access the buy order table 134. The database management system 124 returns a processing result 143-2 for the SQL statement 143-1 to the matching unit 123. The processing result 143-2 indicates that the buying price is 8400 yen and the total quantity is 1600 shares.

Since the processing result 143-2 indicates 1600 shares that exceeds the unexecuted 500 shares of the 900 shares requested by the order message 142-1, the matching unit 123 determines to narrow down corresponding records by order number to take some of them as trading partners. Then, the matching unit 123 issues an SQL statement 143-3 to the database management system 124. The SQL statement 143-3 is a search query for searching the buy order table 134 to find records with the buying prices of 8400 yen or more, and sorting the found records in descending order of buying price and also in ascending order of order number within the same buying price.

When receiving the SQL statement 143-3, the database management system 124 searches the buying price index 137 to find nodes with the buying prices of 8400 yen or more, and specifies the records in the buy order table 134, from the found nodes. The database management system 124 retrieves the specified records, stores them in a temporary space, and sorts them by buying price and order number in the temporary space. The database management system 124 opens a cursor (cursor 2) for fetching the search result row by row, and returns a processing result 143-4 indicating the cursor 2 to the matching unit 123.

The matching unit 123 issues an SQL statement 143-5 for fetching the next row of the search result to the database management system 124 using the cursor 2 indicated in the processing result 143-4. When receiving the SQL statement 143-5, the database management system 124 retrieves the beginning record from the sorted search result stored in the temporary space, and returns a processing result 143-6 indicating the retrieved record to the matching unit 123. The processing result 143-6 indicates that the buying price is 8400 yen and the quantity is 500 shares.

Since the processing result 143-6 indicates 500 shares that are less than or equal, to the unexecuted 500 shares of the 900 shares requested by the order message 142-1, the matching unit 123 determines to take the record indicated in the processing result 143-6, in its entire quantity as a trading partner. Then, the matching unit 123 issues an SQL statement 143-7 to the database management system 124. The SQL statement. 143-7 is a deletion query for deleting the record indicated in the processing result 143-6 from the buy order table 134.

When receiving the SQL statement 143-7, the database management system 124 deletes the record indicated in the processing result 143-6 from the buy order table 134. The record may be specified using the order number. In addition, the database management system 124 updates the buying price index 137 so as to reflect the deletion of the record. The database management system 124 returns a processing result 143-8 for the SQL statement 143-7 to the matching unit 123. The processing result 143-8 indicates that the record has been deleted successfully. The order processing of the sell order indicated by the order message 142-1 is now complete.

Figure 16:
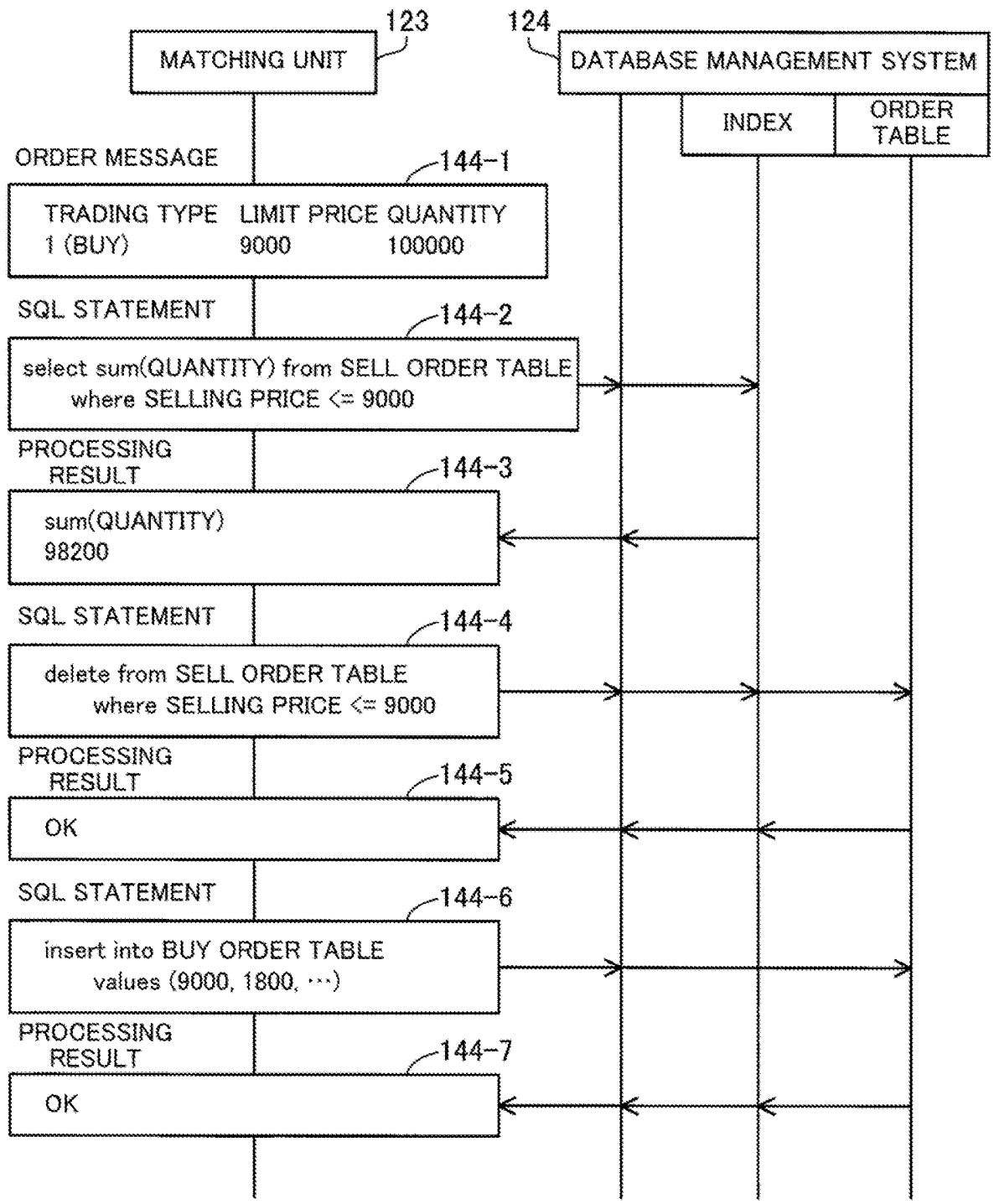
FIG. 16 is a view illustrating a first example of processing a query for a buy order.

FIG. 16 is a view illustrating a first example of processing a query for a buy order.

The matching unit 123 extracts an order message 144-1 from the order queue 122. The order message 144-1 indicates a buy order of 100000 shares at 9000 yen. The matching unit 123 issues an SQL statement 144-2 to the database management system 124. The SQL statement 144-2 is a search query for searching the sell order table 133 to find records with selling prices of 9000 yen or less and obtaining the total sum quantity from the found records.

When receiving the SQL statement 144-2, the database management system 124 searches the selling price index 136 to find nodes with the selling prices of 9000 yen or less and obtains the total sum quantity from the found nodes. At this time, the database management system 124 does not need to access the sell order table 133. The database management system 124 returns a processing result 144-3 for the SQL statement 144-2 to the matching unit 123. The processing result 144-3 indicates that the total sum quantity requested by the SQL statement 144-2 is 98200 shares.

Since the processing result 144-3 indicates 98200 shares that are less than the 100000 shares requested by the order message 144-1, the matching unit 123 determines to take all records satisfying the search condition described in the SQL statement 144-2 as trading partners. Then, the matching unit 123 issues an SQL statement 144-4 to the database management system 124. The SQL statement 144-4 is a deletion query for deleting the records with the selling prices of 9000 yen or less from the sell order table 133.

When receiving the SQL statement 144-4, the database management system 124 searches the selling price index 136 to find nodes with the selling prices of 9000 yen or less and specifies the records in the sell order table 133, from the found nodes. The database management system 124 deletes the specified records from the sell order table 133. In addition, the database management system 124 updates the selling price index 136 so as to reflect the deletion of the records. Then, the database management system 124 returns a processing result 144-5 for the SQL statement 144-4 to the matching unit 123. The processing result 144-5 indicates that the records have been deleted successfully.

Since a trade of 1800 shares out of the 100000 shares requested by the order message 144-1 is not executed, the matching unit 123 issues an SQL statement 144-6 to the database management system 124. The SQL statement 144-6 is an insertion query for inserting a record indicating a buy order of 1800 shares at a buying price of 9000 yen in the buy order table 134. When receiving the SQL statement 144-6, the database management system 124 inserts the record in the buy order table 134 and updates the buying price index 137 so as to reflect the insertion of the record. The database management system 124 returns a processing result 144-7 for the SQL statement 144-6 to the matching unit 123. The processing result 144-7 indicates that the record has been inserted successfully. The order processing of the buy order indicated by the order message 144-1 is now complete.

Figure 17:
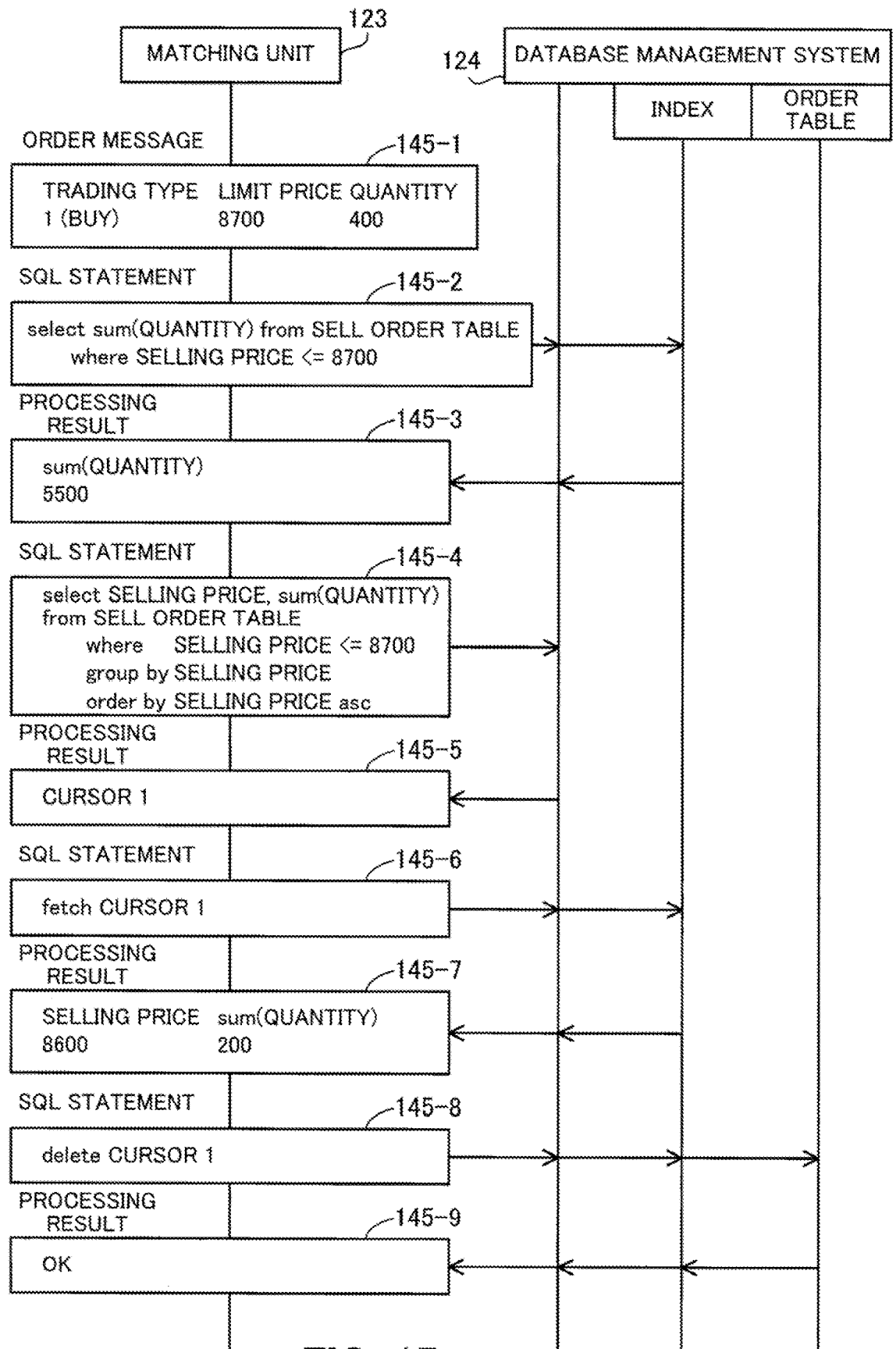
FIG. 17 is a view illustrating a second example of processing a query for a buy order.

FIG. 17 is a view illustrating a second example of processing a query for a buy order.

The matching unit 123 extracts an order message 145-1 from the order queue 122. The order message 145-1 indicates a buy order of 400 shares at 8700 yen. The matching unit 123 issues an SQL statement 145-2 to the database management system 124. The SQL statement 145-2 is a search query for searching the sell order table 133 to find records with selling prices of 8700 yen or less and obtaining the total sum quantity from the found records.

When receiving the SQL statement 145-2, the database management system 124 searches the selling price index 136 to find nodes with the selling prices of 8700 yen or less and obtains the total sum quantity from the found nodes. At this time, the database management system 124 does not need to access the sell order table 133. The database management system 124 returns a processing result 145-3 for the SQL statement 145-2 to the matching unit 123. The processing result 145-3 indicates that the total sum quantity requested by the SQL statement 145-2 is 5500 shares.

Since the processing result 145-3 indicates 5500 shares that exceeds the 400 shares requested by the order message 145-1, the matching unit 123 determines to narrow down corresponding records by selling price to take some of them as trading partners. Then, the matching unit 123 issues an SQL statement 145-4 to the database management system 124. The SQL statement 145-4 is a search query for searching the sell order table 133 to find records with the selling prices of 8700 yen or less, obtaining the total quantity from the found records for each selling price, and sorting the total quantities in ascending order of selling price.

When receiving the SQL statement 145-4, the database management system 124 opens a cursor (cursor 1) for fetching the search result row by row, and returns a processing result 145-5 indicating the cursor 1 to the matching unit 123.

The matching unit 123 issues an SQL statement 145-6 for fetching the next row of the search result to the database management system 124 using the cursor 1 indicated in the processing result 145-5. When receiving the SQL statement 145-6, the database management system 124 searches the selling price index 136 to find a node with the lowest selling price of 8600 yen, and retrieves the total quantity from the found node. At this time, the database management system 124 does not need to access the sell order table 133. The database management system 124 returns a processing result 145-7 for the SQL statement 145-6 to the matching unit 123. The processing result 145-7 indicates that the selling price is 8600 yen and the total quantity is 200 shares.

Since the processing result 145-7 indicates 200 shares that are less than or equal to the 400 shares requested by the order message 145-1, the matching unit 123 determines to take all records with the selling price of 8600 yen as trading partners. Then, the matching unit 123 issues an SQL statement 145-8 to the database management system 124. The SQL statement 145-8 is a deletion query for deleting the records indicated in the processing result 145-7 from the sell order table 133.

When receiving the SQL statement 145-8, the database management system 124 searches the selling price index 136 to find a node with the selling price of 8600 yen and specifies the records in the sell order table 133, from the found node. The database management system 124 deletes the specified records from the sell order table 133. The database management system 124 updates the selling price index 136 so as to reflect the deletion of the records. The database management system 124 returns a processing result 145-9 for the SQL statement 145-8 to the matching unit 123. The processing result 145-9 indicates that the records have been deleted successfully.

Figure 18:
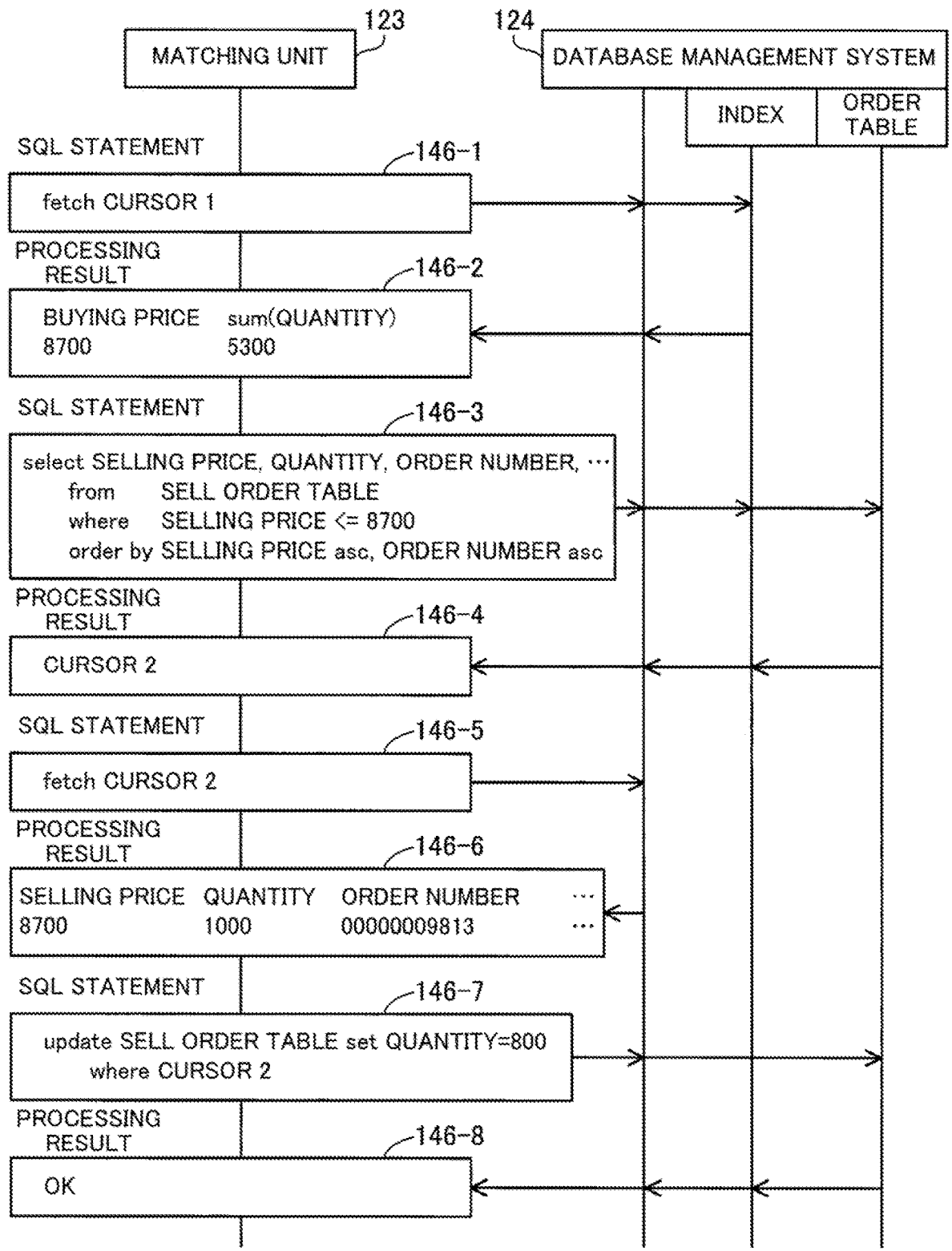
FIG. 18 is a view illustrating the second example of processing the query for the buy order (continued)

FIG. 18 is a view illustrating the second example of processing the query for the buy order (continued).

The matching unit 123 issues an SQL statement 146-1 for fetching the next row of the search result to the database management system 124 using the cursor 1 indicated in the processing result 145-5. When receiving the SQL statement 146-1, the database management system 124 searches the selling price index 136 to find a node with the next lowest selling price of 8700 yen, and retrieves the total quantity from the found node. At this time, the database management system 124 does not need to access the sell order table 133. The database management system 124 returns a processing result 146-2 for the SQL statement 146-1 to the matching unit 123. The processing result 146-2 indicates that the selling price is 8700 yen and the total quantity is 5300 shares.

Since the processing result 146-2 indicates 5300 shares that exceeds the unexecuted 200 shares of the 400 shares requested by the order message 145-1, the matching unit 123 determines to narrow down corresponding records by order number to take some of them as trading partners. Then, the matching unit 123 issues an SQL statement 146-3 to the database management system 124. The SQL statement 146-3 is a search query for searching the sell order table 133 to find records with the selling prices of 8700 yen or less, and sorting the found records in ascending order of selling price and in ascending order of order number within the same selling price.

When receiving the SQL statement 146-3, the database management system 124 searches the selling price index 136 to find nodes with the selling prices of 8700 yen or less, and specifies the records in the sell order table 133, from the nodes. The database management system 124 retrieves the specified records, stores them in a temporary space, and sorts them by selling price and order number in the temporary space. The database management system 124 opens a cursor (cursor 2) for fetching the search result row by row, and returns a processing result 146-4 indicating the cursor 2 to the matching unit 123.

The matching unit 123 issues an SQL statement 146-5 for fetching the next row of the search result to the database management system 124 using the cursor 2 indicated in the processing result 146-4. When receiving the SQL statement 146-5, the database management system 124 retrieves the beginning record from the sorted search result stored in the temporary space, and returns a processing result 146-6 indicating the retrieved record to the matching unit 123. The processing result 146-6 indicates that the selling price is 8700 yen and the quantity is 1000 shares.

Since the processing result 146-6 indicates 1000 shares that exceeds the unexecuted 200 shares of the 400 shares requested by the order message 145-1, the matching unit 123 determines to take the record indicated in the processing result 146-6, in its partial quantity as a trading partner. Then, the matching unit 123 issues an SQL statement 146-7 to the database management system 124. The SQL statement 146-7 is an update query for reducing the quantity of the record indicated in the processing result 146-6 by 200 shares.

When receiving the SQL statement 146-7, the database management system 124 searches the sell order table 133 to find the record indicated in the processing result 146-6. The record may be specified using the order number. The database management system 124 updates the quantity of the record from 1000 shares to 800 shares. In addition, the database management system 124 updates the selling price index 136 so as to reflect the update of the record. The database management system 124 returns a processing result 146-8 for the SQL statement 146-7 to the matching unit 123. The processing result 146-8 indicates that the record has been updated successfully. The order processing of the buy order indicated by the order message 145-1 is now complete.

As described above, in matching of sell order and buy order using the relational database, the matching unit 123 frequently issues SQL statements including the sum function SUM, which is a type of set function. Therefore, the database management system 124 adds total quantity to the selling price index 136 and buying price index 137, to thereby reduce the necessity of access to the sell order table 133 and buy order table 134 and so efficiently process the SQL statements. In this connection, the above describes SQL statements that are issued by the matching unit 123. In addition, the use of the total quantity added to the selling price index 136 and buying price index 137 also contributes to efficiently processing SQL statements that the order book generation unit 127 issues to generate the order book information 132.

The following describes how the server apparatus 100 operates.

Figure 19:
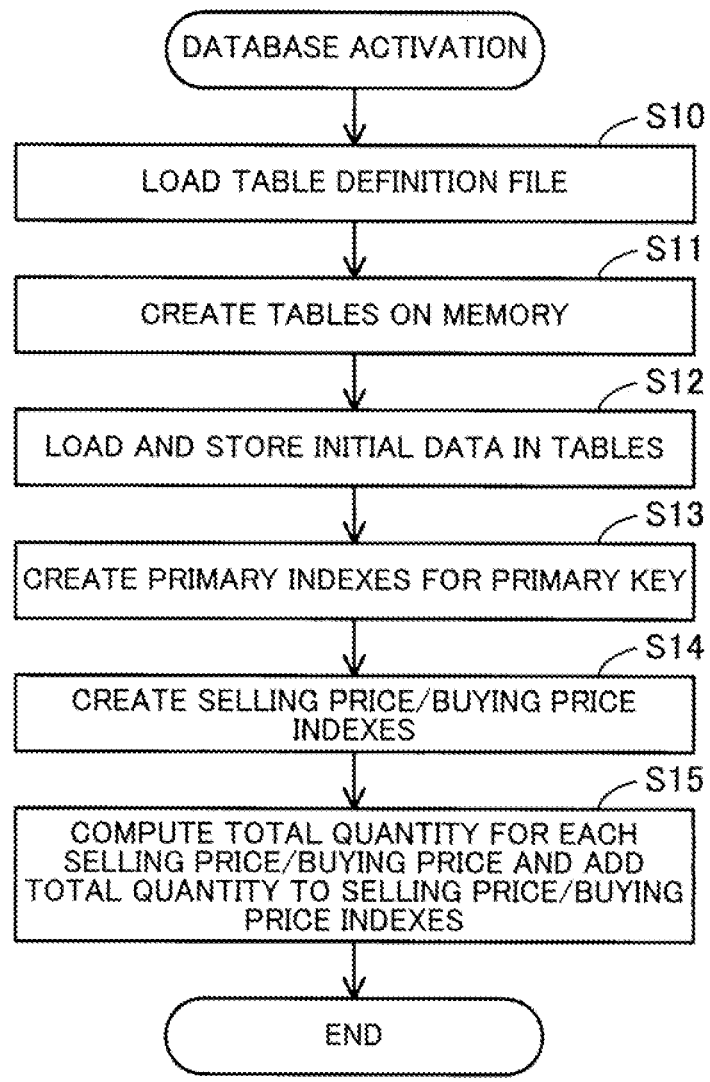
FIG. 19 is a flowchart for database activation.

FIG. 19 is a flowchart for database activation.

(S10) The database management system 124 loads the table definition file 138. For example, the database management system 124 loads the table definition file 138 from the HDD 103 to the RAM 102.

(S11) The database management system 124 creates tables with the structures defined by the table definition file 138 loaded at step S10, on the RAM 102. The created tables include the sell order table 133 and the buy order table 134. The sell order table 133 and buy order table 134 belong to the order database 125.

(S12) The database management system 124 loads previously saved initial data in the blank tables created at step S11. For example, the table definition file 138 loads the initial data stored in the HDD 103.

(S13) With respect to each table, the database management system 124 specifies a primary key and creates a primary index that enables searching for a record on the basis of a value of the primary key, with reference to the table definition file 138. The created primary indexes are a primary index that corresponds to the sell order table 133 and uses order number as a primary key, and a primary index that corresponds to the buy order table 134 and uses order number as a primary key.

(S14) The database management system 124 creates the selling price index 136 that enables searching the sell order table 133, to which the initial data has been loaded, to find records by selling price, with reference to the table definition file 138. Each node in thus created selling price index 136 has selling price, record count, pointer to address list, and pointers to child nodes. In addition, the database management system 124 creates the buying price index 137 that enables searching the buy order table 134, to which the initial data has been loaded, to find records by buying price, with reference to the table definition file 138. Each node in thus created buying price index 137 has buying price, record count, pointer to address list, and pointers to child nodes.

(S15) The database management system 124 adds a total quantity to each node of the selling price index 136 created at step S14. More specifically, with respect to each node, the database management system 124 retrieves the quantities of the records listed in the address list from the sell order table 133, and sums the retrieved quantities. In addition, the database management system 124 adds a total quantity to each node of the buying price index 137. More specifically, with respect to each node, the database management system 124 retrieves the quantities of the records listed in the address list from the buy order table 134 and sums the retrieved quantities.

Figure 20:
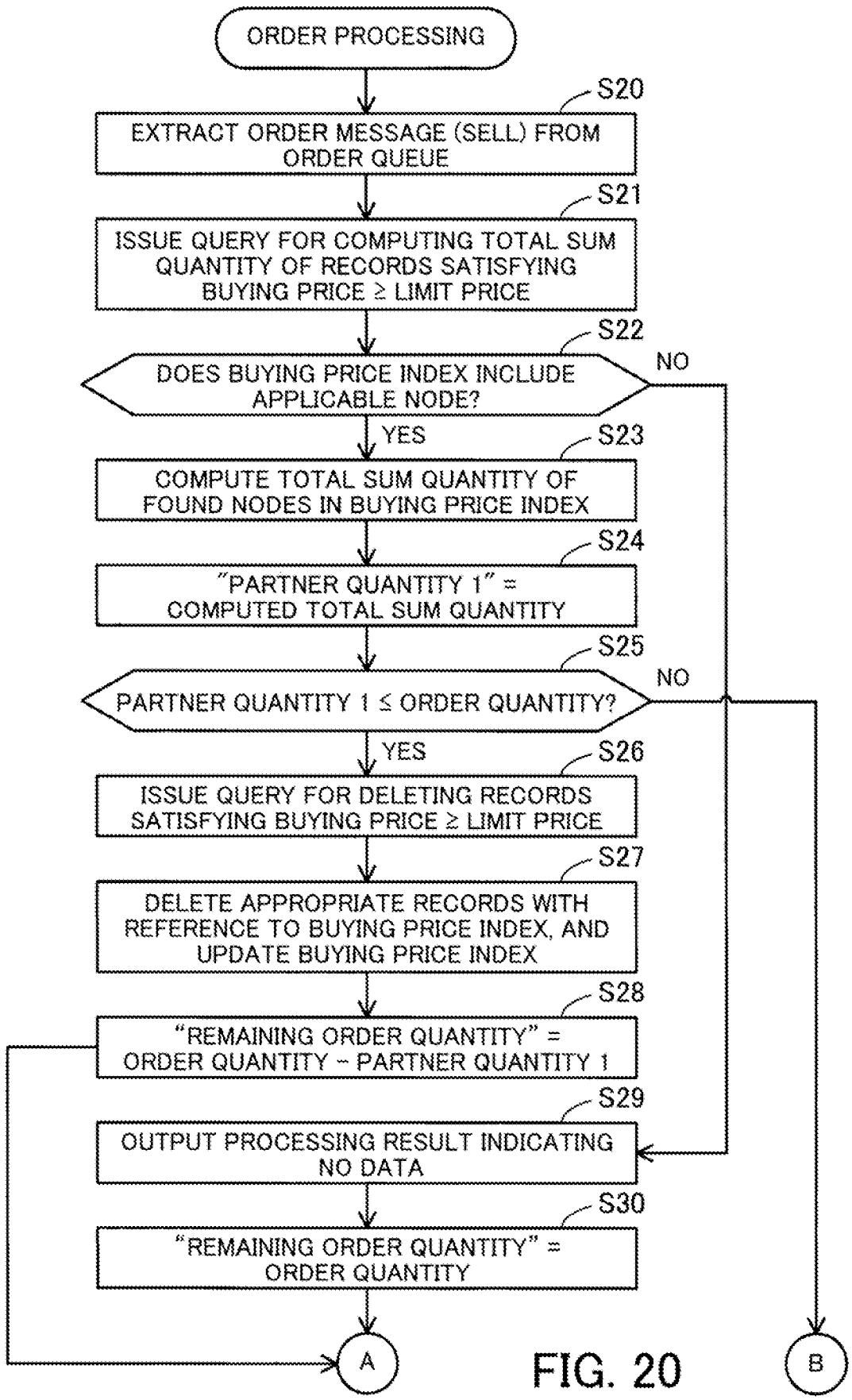
FIG. 20 is a flowchart illustrating order processing.

FIG. 20 is a flowchart illustrating order processing.

(S20) The matching unit 123 extracts an order message from the order queue 122. The following description is about order processing to be performed when an order message indicating a sell order, i.e., an order message with trading type of 2, is extracted. Since processing of a sell order and processing of a buy order are symmetrical, the processing of the buy order will be described together.

(S21) The matching unit 123 issues a query for searching the buy order table 134 to find records with buying prices higher than or equal, to the limit price of the sell order and obtaining the total sum quantity from the found records. The query issued here corresponds to the above-described SQL statements 141-2 and 142-2. On the other hand, with respect to the order message indicating the buy order, the matching unit 123 issues a query for searching the sell order table 133 to find records with selling prices lower than or equal to the limit price of the buy order and obtaining the total sum quantity from the found records. The query issued in this case corresponds to the above-described SQL statements 144-2 and 145-2.

(S22) The database management system 124 determines whether the buying price index 137 includes any node that satisfies a buying price condition, "buying price is higher than or equal to the limit price of the sell order," described in the query. If such a node is found, the process proceeds to step S23. If no such a node is found, the process proceeds to step S29. On the other hand, with respect to the order message indicating the buy order, the database management system 124 determines whether the selling price index 136 includes any node that satisfies a selling price condition, "selling price is lower than or equal to the limit price of the buy order," described in the query.

(S23) The database management system 124 searches the buying price index 137 to find one or more nodes satisfying the buying price condition described in the query, retrieves the total quantities from the found one or more nodes, and computes the sum of the retrieved total quantities as the total sum quantity. The database management system 124 returns a processing result including the computed total, sum quantity to the matching unit 123. The processing result generated here corresponds to the above-described processing results 141-3 and 142-3. On the other hand, with respect to the order message indicating the buy order, the database management system 124 searches the selling price index 136 to find one or more nodes satisfying the selling price condition described in the query, retrieves the total quantities from the found one or more nodes, and computes the sum of the retrieved total, quantities as the total, sum quantity.

(S24) The matching unit 123 takes the total sum quantity of step S23 as "partner quantity 1."

(S25) The matching unit 123 determines whether the "partner quantity 1" is less than or equal to the order quantity requested by the order message. If the "partner quantity 1" is less than or equal to the order quantity, the process proceeds to step S26. Otherwise, the process proceeds to step S36.

(S26) The matching unit 123 issues a query for deleting the records with the buying prices higher than or equal, to the limit price of the sell order, from the buy order table 134. The query issued here corresponds to the above-described SQL statement 141-4. On the other hand, with respect to the order message indicating the buy order, the matching unit 123 issues a query for deleting records with selling prices lower than or equal to the limit price of the buy order, from the sell order table 133. The query issued in this case corresponds to the above-described SQL statement 144-4.

(S27) The database management system 124 searches the buying price index 137 to find nodes satisfying the buying price condition described in the query of step S26, and deletes the records indicated in the found nodes, from the buy order table 134. In addition, the database management system 124 updates the buying price index 137 by deleting the addresses of the records from the found nodes and changing the total quantity to zero in the nodes. Also, the database management system 124 updates the primary index. Then, the database management system 124 returns a processing result for the query of step S26 to the matching unit 123. The processing result generated here corresponds to the above-described processing result 141-5. On the other hand, with respect to the order message indicating the buy order, the database management system 124 searches the selling price index 136 to find nodes satisfying the selling price condition described in the query and deletes the records indicated in the found nodes, from the sell order table 133. The processing result generated in this case corresponds to the above-described processing result 144-5.

(S28) The matching unit 123 computes "remaining order quantity" by subtracting the "partner quantity 1" of step S24 from the order quantity. Then, the process proceeds to step S31.

(S29) The database management system 124 generates a processing result indicating no data and returns it to the matching unit 123.

(S30) The matching unit 123 takes the order quantity as "remaining order quantity."

Figure 21:
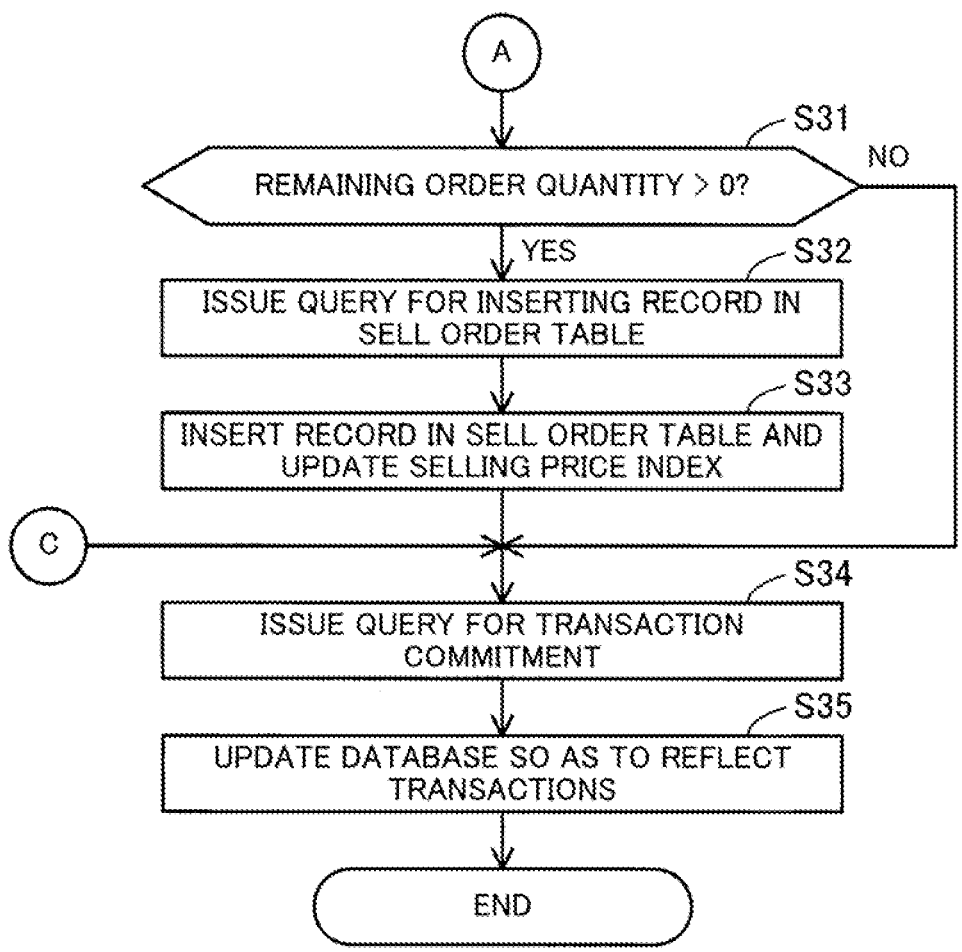
FIG. 21 is a flowchart illustrating the order processing (continued—part one)

FIG. 21 is a flowchart illustrating the order processing (continued—part one).

(S31) The matching unit 123 determines whether the "remaining order quantity" is greater than zero. If the "remaining order quantity" is greater than zero, the process proceeds to step S32. If the "remaining order quantity" is zero, the process proceeds to step S34.

(S32) The matching unit 123 issues a query for inserting a record indicating a sell order for the "remaining order quantity" in the sell order table 133. The "remaining order quantity" is set in the quantity column in the record, and the other columns are set as in the order messages. The query issued here corresponds to the above-described SQL statement 141-6. On the other hand, with respect to the order message indicating the buy order, the matching unit 123 issues a query for inserting a record indicating a buy order for "remaining order quantity" in the buy order table 134. The query issued in this case corresponds to the above-described SQL statement 144-6.

(S33) The database management system 124 inserts the record in the sell order table 133. In addition, the database management system 124 updates the selling price index 136 by adding the address of the record in the node corresponding to the selling price of the inserted record and adding the quantity of the record to the total, quantity in the node. In addition, the database management system 124 updates the primary index. Then, the database management system 124 returns a processing result to the matching unit 123. The processing result generated here corresponds to the above-described processing result 141-7. On the other hand, with respect to the order message indicating the buy order, the database management system 124 inserts a record in the buy order table 134 and updates the buying price index 137. The processing result generated in this case corresponds to the above-described processing result 144-7.

(S34) The matching unit 123 issues a query indicating a transaction commitment for fixing a series of data operations performed until this time point, to the database management system 124.

(S35) The database management system 124 fixes the transactions including the series of data operations and updates the order database 125 so as to reflect them. The database management system 124 returns a processing result of the transaction commitment to the matching unit 123. The order processing of the order message of step S20 is now complete.

Figure 22:
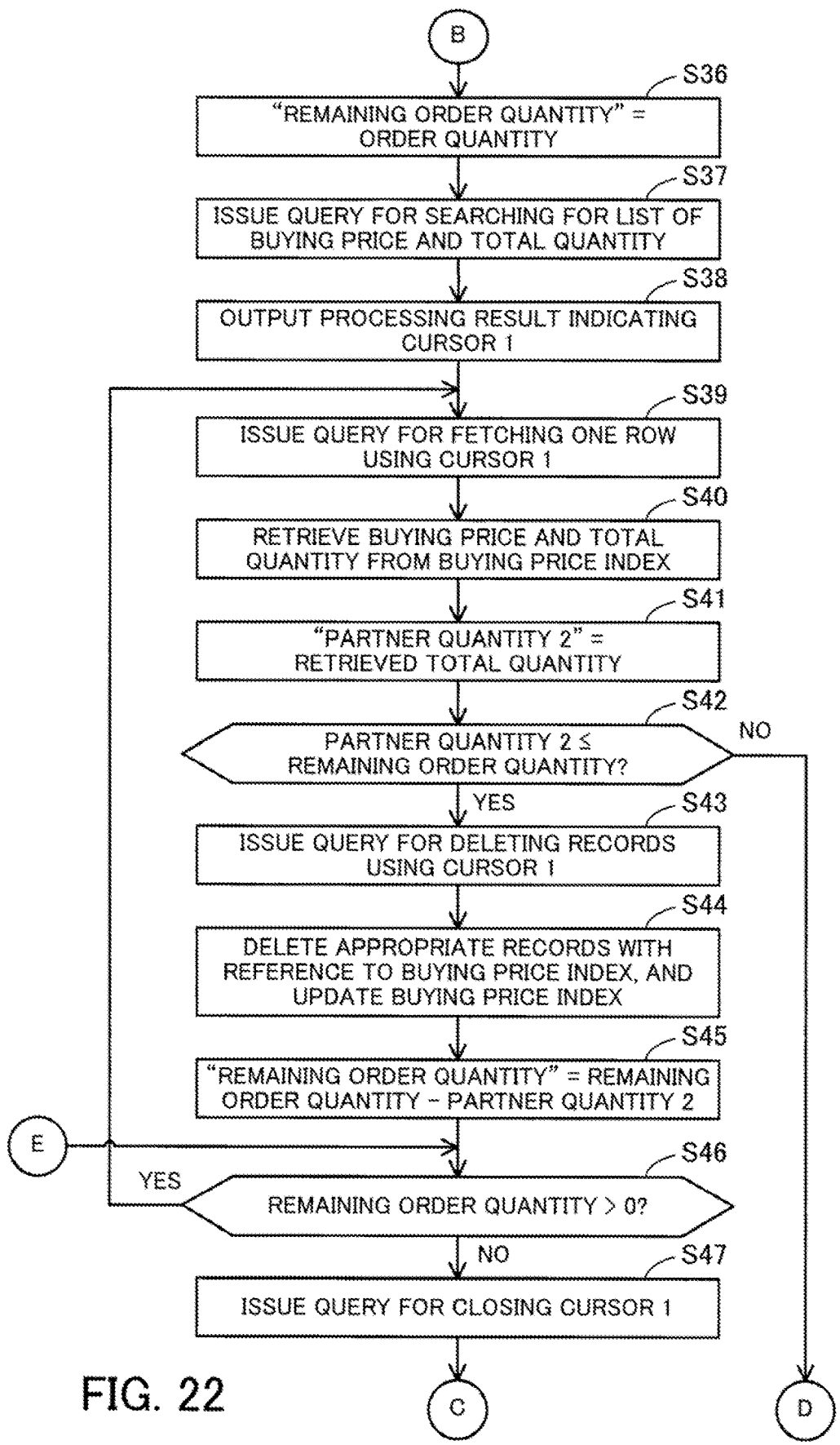
FIG. 22 is a flowchart illustrating the order processing (continued—part two)

FIG. 22 is a flowchart illustrating the order processing (continued—part two).

(S36) The matching unit 123 takes the order quantity as "remaining order quantity."

(S37) The matching unit 123 issues a query for searching the buy order table 134 to find records with buying prices higher than or equal to the limit price of the sell order, computing the sum of the quantities indicated in the found records for each buying price, and obtaining a list of combinations of buying price and total quantity. At this time, the query may request sorting of the combinations of buying price and total quantity in descending order of buying price in the processing result. The query issued here corresponds to the above-described SQL statement 142-4. On the other hand, with respect to the order message indicating the buy order, the matching unit 123 issues a query for searching the sell order table 133 to find records with selling prices lower than or equal to the limit price of the buy order, computing the sum of the quantities indicated in the found records for each selling price, and obtaining a list of combinations of selling price and total quantity. At this time, the query may request sorting of the combinations of selling price and total quantity in ascending order of selling price in the processing result. The query issued in this case corresponds to the above-described SQL statement 145-4.

(S38) The database management system 124 opens "cursor 1" for fetching the query result row by row, and returns a processing result indicating the "cursor 1" to the matching unit 123. The processing result generated here corresponds to the above-described processing results 142-5 and 145-5.

(S39) The matching unit 123 issues a query for fetching the next row of the query result using the "cursor 1" opened at step 338. The query issued here corresponds to the above-described SQL statements 142-6, 143-1, 145-6, and 146-1.

(S40) The database management system 124 preferentially selects one unselected node (next node) in descending order of buying price from among the one or more nodes satisfying the buying price condition, "buying price is higher than or equal to the limit price of the sell order," in the buying price index 137. The database management system 124 retrieves the buying price and total quantity from the selected node, and returns a processing result including the retrieved buying price and total quantity to the matching unit 123. The processing result generated here corresponds to the above-described processing results 142-7 and 143-2. On the other hand, with respect to the order message indicating the buy order, the database management system 124 preferentially selects one unselected node (next node) in ascending order of selling price from among one or more nodes satisfying the selling price condition, "selling price is lower than or equal to the limit price of the buy order," in the selling price index 136. The processing result generated in this case corresponds to the above-described processing results 145-7 and 146-2.

(S41) The matching unit 123 takes the retrieved total quantity as "partner quantity 2."

(S42) The matching unit 123 determines whether the "partner quantity 2" is less than or equal to the "remaining order quantity." If the "partner quantity 2" is less than or equal to the "remaining order quantity," the process proceeds to step S43. If the "partner quantity 2" exceeds the "remaining order quantity," the process proceeds to step S48.

(S43) The matching unit 123 issues a query for deleting the records indicated in the query result currently pointed to by the "cursor 1" from the buy order table 134. The query issued here corresponds to the above-described SQL statement 142-8. On the other hand, with respect to the order message indicating the buy order, the matching unit 123 issues a query for deleting the records indicated in the query result currently pointed to by the "cursor 1" from the sell order table 133. The query issued in this case corresponds to the above-described SQL statement 145-8.

(S44) The database management system 124 searches the buying price index 137 to find a node with the buying price pointed to by the "cursor 1" and deletes the records indicated in the found node from the buy order table 134. In addition, the database management system 124 updates the buying price index 137 by deleting the addresses of the records from the found node and changing the total quantity to zero. In addition, the database management system 124 updates the primary index. Then, the database management system 124 returns a processing result for the query of step S43 to the matching unit 123. The processing result generated here corresponds to the above-described processing result 142-9. On the other hand, with respect to the order message indicating the buy order, the database management system 124 searches the selling price index 136 to find a node with the selling price pointed to by the "cursor 1" and deletes the records indicated in the found node from the sell order table 133. The processing result generated in this case corresponds to the above-described processing result 145-9.

(S45) The matching unit 123 subtracts the "partner quantity 2" from the "remaining order quantity."

(S46) The matching unit 123 determines whether the "remaining order quantity" is greater than zero. If the "remaining order quantity" is greater than zero, the process proceeds to step S39. If the "remaining order quantity" is zero, the process proceeds to step S47.

(S47) The matching unit 223 issues a query for closing the "cursor 1." The database management system 124 deletes information about the "cursor 1" and returns a processing result indicating a success in the closing to the matching unit 123. Then, the process proceeds to step S34.

Figure 23:
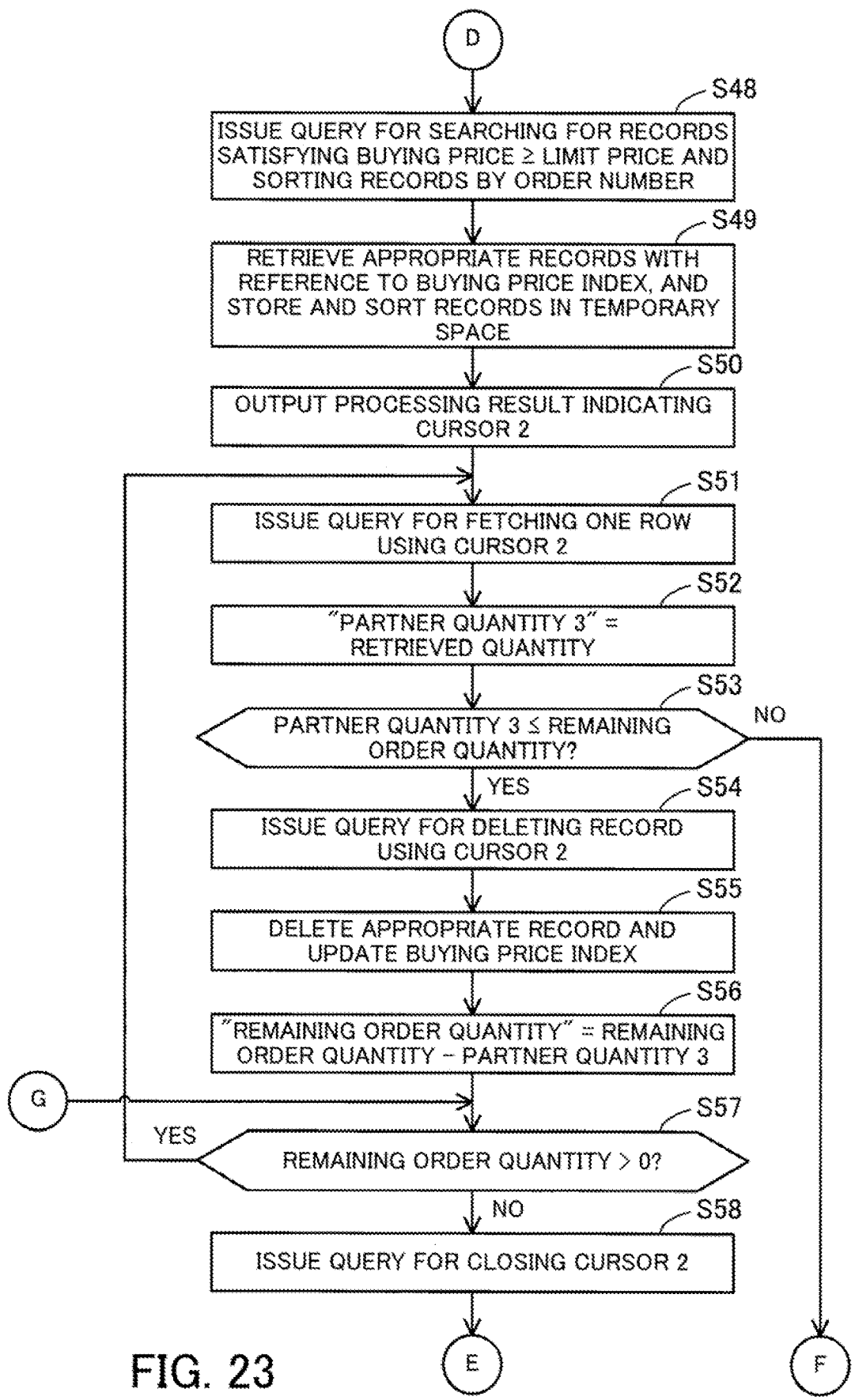
FIG. 23 is a flowchart illustrating the order processing (continued—part three)

FIG. 23 is a flowchart illustrating the order processing (continued—part three).

(S48) The matching unit 123 issues a query for searching the buy order table 134 to find records with buying prices higher than or equal to the limit price of the sell order and sorting the found records in descending order of buying price, as the first sorting rule, and in ascending order of order number, as the second sorting rule. The query issued here corresponds to the above-described SQL statement 143-3. On the other hand, with respect to the order message indicating the buy order, the matching unit 123 issues a query for searching the sell order table 133 to find records with selling prices lower than or equal, to the limit price of the buy order and sorting the found records in ascending order of selling price and in ascending order of order number. The query issued in this case corresponds to the above-described SQL statement 146-3.

(S49) The database management system 124 searches the buying price index 137 to find nodes satisfying the buying price condition of step 348 and retrieves the records indicated in the found nodes from the buy order table 134. The database management system 124 stores the retrieved records in a temporary space of the RAM 102 and sorts the records in descending order of buying price, as a first sorting rule, and in ascending order of order number, as a second sorting rule. On the other hand, with respect to the order message indicating the buy order, the database management system 124 searches the selling price index 136 to find nodes satisfying the selling price condition and retrieves the records indicated in the found nodes from the sell order table 133.

(S50) The database management system 124 opens a "cursor 2" for fetching the query result row by row and returns a processing result indicating the "cursor 2" to the matching unit 123. The processing result generated here corresponds to the above-described processing results 143-4 and 146-4.

(S51) The matching unit. 1.23 issues a query for fetching the next row of the query result using the "cursor 2" opened at step S50. The query issued here corresponds to the above-described SQL statements 143-5 and 146-5. The database management system 124 preferentially retrieves one unselected record (next record) closest to the beginning from the one or more records stored in the temporary space of step S49. The database management system 124 returns a processing result including the retrieved record to the matching unit 123. The processing result generated here corresponds to the above-described processing results 143-6 and 146-6.

(S52) The matching unit 123 takes the retrieved quantity as "partner quantity 3."

The matching unit 123 determines whether the "partner quantity 3" is less than or equal to the "remaining order quantity." If the "partner quantity 3" is less than or equal to the "remaining order quantity," the process proceeds to step S54. Otherwise, the process proceeds to step S59.

(S54) The matching unit 123 issues a query for deleting the record pointed to by the "cursor 2" from the buy order table 134. The query issued here corresponds to the above-described SQL statement 143-7. On the other hand, with respect to the order message indicating the buy order, the matching unit 123 issues a query for deleting the record pointed to by the "cursor 2" from the sell order table 133.

(S55) The database management system 124 deletes the record pointed to by the "cursor 2" from the buy order table 134. At this time, the database management system 124 may specify the record to be deleted, using order number or primary index. In addition, the database management system 124 updates the buying price index 137 by deleting the address of the record from the node corresponding to the buying price of the deleted record and reducing the total quantity of the node by the quantity indicated in the record. In addition, the database management system 124 updates the primary index. Then, the database management system 124 returns a processing result for the query of step S54 to the matching unit 123. The processing result generated here corresponds to the above-described processing result 143-8. On the other hand, with respect to the order message indicating the buy order, the database management system 124 deletes the record pointed to by the "cursor 2" from the sell order table 133 and updates the selling price index 136.

(S56) The matching unit 123 subtracts the "partner quantity 3" from the "remaining order quantity."

(S57) The matching unit 123 determines whether the "remaining order quantity" is greater than zero. If the "remaining order quantity" is greater than zero, the process proceeds to step S51. If the "remaining order quantity" is zero, the process proceeds to step S58.

(S58) The matching unit 123 issues a query for closing the "cursor 2." The database management system 124 deletes information about the "cursor 2" and returns a processing result indicating a success in the closing to the matching unit 123. Then, the process proceeds to step S46.

Figure 24:
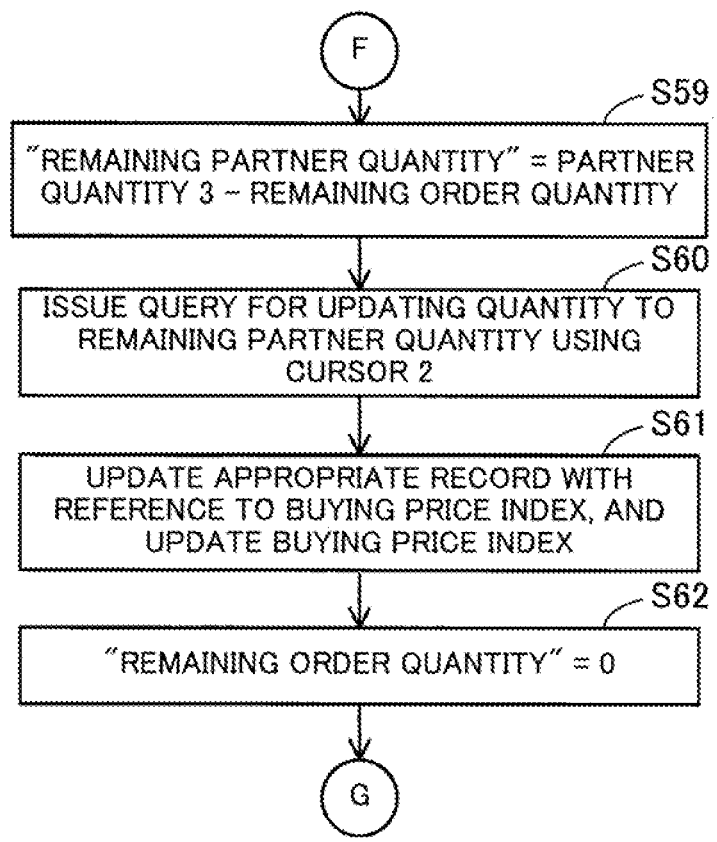
FIG. 24 is a flowchart illustrating the order processing (continued—part four).

FIG. 24 is a flowchart illustrating the order processing (continued—part four).

(S59) The matching unit 123 subtracts the current "remaining order quantity" from the "partner quantity 3" of step S52 and takes the result as "remaining partner quantity."

(S60) The matching unit 123 issues a query for updating the quantity in the record pointed to by the "cursor 2" to the "remaining partner quantity" of step S59. The query issued here corresponds to the above-described SQL statement 146-7.

(S61) The database management system 124 specifies the record pointed to by the "cursor 2" in the buy order table 134 and updates the quantity in the specified record. At this time, the database management system 124 may specify the record to be updated, using order number or primary index. In addition, the database management system 124 updates the buying price index 137 by subtracting a difference in quantity between before and after the update from the total quantity of the node corresponding to the buying price of the updated record. Then, the database management system 124 returns a processing result for the query of step S60 to the matching unit 123. The processing result generated here corresponds to the above-described processing result 146-8. On the other hand, with respect to the order message indicating the buy order, the database management system 124 updates the record pointed to by the "cursor 2" in the sell order table 133, and updates the selling price index 136.

(S62) The matching unit 123 sets the "remaining order quantity" to zero. This indicates that the trade for the entire quantity has been executed. Then, the process proceeds to step S57.

In the information processing system of the second embodiment, each node of the selling price index 136 corresponding to the sell order table 133 has registered therein the total quantity obtained from records with a selling price indicated in the node. In addition, each node of the buying price index 137 corresponding to the buy order table 134 has registered therein the total quantity obtained from records with a buying price indicated in the node. Therefore, the database management system 124 is able to return a result of the sum function SUM for a query including the sum function SUM, without retrieving values of the quantity column from the sell order table 133 or the buy order table 134. This accelerates processing of the query including the sum function SUM. In addition, since the database management system 124 is able to process the query including the sum function SUM at a fast speed, an application using the database management system 124 does not need to individually obtain records and then compute the total quantity, which reduces a load on the application.

In addition, in the stock order processing, the use of the total quantity for each selling price and the total quantity for each buying price enables performing collective processing on a group of records with a specified selling price or a group of records with a specified buying price, without individually retrieving the quantities or order numbers from the records. Therefore, the database management system 124 is able to process a query including the sum function SUM at a high speed, which enables fast stock trading at the securities exchange 31. Especially, in stock trading in panic in which there may come sell orders with limit prices greatly below the present price or buy orders with limit prices greatly exceeding the present price, many candidate trading partners may exist for one order. Even in this case, a query including the sum function SUM is processed at a fast speed, thereby achieving fast stock trading, as compared with a method of individually retrieving quantities from records.

In this connection, the second embodiment has described an example of performing stock trading using a database. The database processing of the second embodiment may be applied to various types of trading, such as securities trading, futures contracts, and product trading.

According to one aspect, a response of a statistical value with respect to a specified data item is accelerated.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus, comprising:
a memory that stores therein, with respect to a database containing a plurality of records each having a first data item and a second data item, an index including, in association with each of a plurality of candidate values that are used as the first data item, record specification information specifying two or more records with said each candidate value as the first data item among the plurality of records and a statistical value obtained from values of the second data item registered in the two or more records specified by the record specification information; and
a processor that calculates the statistical value from the two or more records and stores the statistical value into the index, receives a query including a search condition specifying a requested value of the first data item and a command requesting statistical processing of values of the second data item registered in records satisfying the search condition among the plurality of records, retrieves the statistical value that is calculated before receiving the query and associated with one of the plurality of candidate values satisfying the search condition from the index, and outputs a processing result based on the retrieved statistical value for the query.

2. The information processing apparatus according to claim 1, wherein the statistical value is a sum, maximum value, minimum value, or average of the values of the second data item registered in the two or more records specified by the record specification information.

3. The information processing apparatus according to claim 1, wherein the first data item represents an order price of a product, the second data item represents an order quantity of the product, and the query requests a sum of order quantities registered in records with order prices falling within a specified range.

4. An information processing apparatus, comprising:
a memory that stores therein, with respect to a database containing a plurality of records each having a first data item and a second data item, an index including, in association with each of a plurality of candidate values that are used as the first data item, record specification information specifying two or more records with said each candidate value as the first data item among the plurality of records and a statistical value obtained from values of the second data item registered in the two or more records specified by the record specification information, the index being a tree index in which a plurality of nodes respectively corresponding to the plurality of candidate values are connected in a tree structure, each of the plurality of nodes having the record specification information and the statistical value; and
a processor that receives a query including a search condition specifying a requested value of the first data item and a command requesting statistical processing of values of the second data item registered in records satisfying the search condition among the plurality of records, retrieves the statistical value associated with one of the plurality of candidate values satisfying the search condition from the index, and outputs a processing result based on the retrieved statistical value for the query.

5. A non-transitory computer-readable recording medium storing a computer program that causes a computer to execute a process comprising:

obtaining, with respect to a database containing a plurality of records each having a first data item and a second data item, an index including, in association with each of a plurality of candidate values that are used as the first data item, record specification information specifying two or more records with said each candidate value as the first data item among the plurality of records;

calculating a statistical value from values of the second data item registered in the two or more records specified by the record specification information, and storing the statistical value into the index;

receiving a query including a search condition specifying a requested value of the first data item and a command requesting statistical processing of values of the second data item registered in records satisfying the search condition among the plurality of records;

retrieving the statistical value that is calculated before receiving the query and associated with one of the plurality of candidate values satisfying the search condition from the index; and outputting a processing result based on the retrieved statistical value for the query.

* * * * *